(12) United States Patent
Christiansen et al.

(10) Patent No.: US 9,714,812 B2
(45) Date of Patent: Jul. 25, 2017

(54) DEVICES FOR ELIMINATING POSITION DISCLOSING LIGHT EMITTED BY A LASER

(71) Applicants: Richard Bert Christiansen, San Diego, CA (US); Cort Wetherald, San Diego, CA (US)

(72) Inventors: Richard Bert Christiansen, San Diego, CA (US); Cort Wetherald, San Diego, CA (US)

( * ) Notice: Subject to any disclaimer, the term of this patent is extended or adjusted under 35 U.S.C. 154(b) by 0 days.

(21) Appl. No.: 14/878,924

(22) Filed: Oct. 8, 2015

(65) Prior Publication Data

US 2016/0054556 A1  Feb. 25, 2016

Related U.S. Application Data

(63) Continuation of application No. PCT/US2014/040525, filed on Jun. 2, 2014.

(Continued)

(51) Int. Cl.
| | |
|---|---|
| *G02B 27/00* | (2006.01) |
| *F41G 1/35* | (2006.01) |
| *G02B 23/16* | (2006.01) |
| *F41G 11/00* | (2006.01) |
| *F41H 3/00* | (2006.01) |

(52) U.S. Cl.
CPC .............. *F41G 1/35* (2013.01); *F41G 11/003* (2013.01); *F41H 3/00* (2013.01); *G02B 23/16* (2013.01); *G02B 27/0006* (2013.01)

(58) Field of Classification Search
CPC ...... G02B 23/00; G02B 23/10; G02B 23/105; G02B 23/16; G03B 11/04; F41G 1/00; F41G 1/38; F41G 1/383; F41G 1/387; F41G 11/00; F41G 11/001
USPC ........... 359/601, 611, 613, 614, 894; 42/111, 42/113, 114, 115, 119, 120, 122, 124, 42/125, 126, 127, 129, 130, 133, 143, 42/146

See application file for complete search history.

(56) References Cited

U.S. PATENT DOCUMENTS

| | | | | |
|---|---|---|---|---|
| 3,699,471 A | * | 10/1972 | Mulready | ............. H01S 3/0979 359/613 |
| 3,867,764 A | | 2/1975 | Dunmire | |

(Continued)

OTHER PUBLICATIONS

Pending claims for U.S. Appl. No. 14/879,402, filed Oct. 9, 2015, submitted Sep. 13, 2016.*

(Continued)

*Primary Examiner* — Arnel C Lavarias

(57) ABSTRACT

A device for preventing secondary light emitted by a laser sight from being seen is disclosed. The device includes a cavity defined by a sidewall and first and second ends of a light containment structure. In some embodiments, the light containment structure is mountable so as to receive light from a laser sight of a weapon through a first opening located at the first end of the light containment structure. The device can include a first portion located at the second end of the light containment structure, and a second opening defined by the first portion and that can pass light from the cavity toward an object such that the object is illuminated to a user of the weapon by the light from the second opening. In some embodiments, the cavity can be configured such that light does not directly illuminate the sidewall.

13 Claims, 15 Drawing Sheets

Related U.S. Application Data

(60) Provisional application No. 61/830,101, filed on Jun. 2, 2013.

(56) References Cited

U.S. PATENT DOCUMENTS

| | | | | |
|---|---|---|---|---|
| 4,023,903 | A * | 5/1977 | Scheib | G03B 21/208 355/67 |
| 4,161,835 | A | 7/1979 | Lough | |
| 4,217,026 | A * | 8/1980 | Radovich | G02B 5/005 359/611 |
| 4,929,055 | A * | 5/1990 | Jones | G02B 5/00 359/601 |
| 5,093,837 | A | 3/1992 | Edwards | |
| 5,201,135 | A * | 4/1993 | Cowles | F41G 1/38 359/600 |
| 5,210,645 | A * | 5/1993 | Orino | G02B 27/0018 359/601 |
| 5,745,292 | A * | 4/1998 | Jones | G02B 27/0018 359/601 |
| 6,707,838 | B2 * | 3/2004 | Tani | H01S 3/0602 372/103 |
| 6,863,187 | B1 | 3/2005 | Robertson | |
| 7,001,030 | B2 * | 2/2006 | Stewart, II | G02B 5/003 359/614 |
| 7,900,390 | B2 | 3/2011 | Moody | |
| 2008/0040965 | A1 | 2/2008 | Solinsky | |
| 2016/0054099 | A1* | 2/2016 | Christiansen | F41G 1/35 42/114 |

OTHER PUBLICATIONS

Search Report and Written Opinion in the priority International Application PCT/US2014/040525 dated Oct. 15, 2014.
International Preliminary Report on Patentability PCT/US2014/040525 dated Sep. 21, 2015.

* cited by examiner

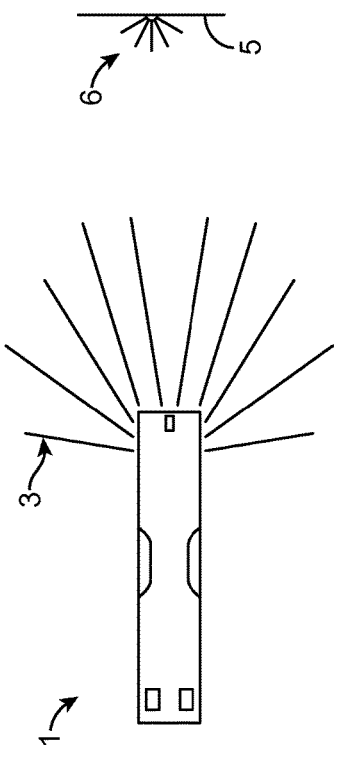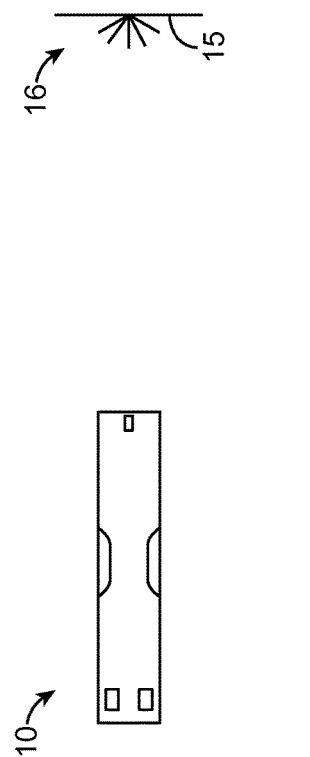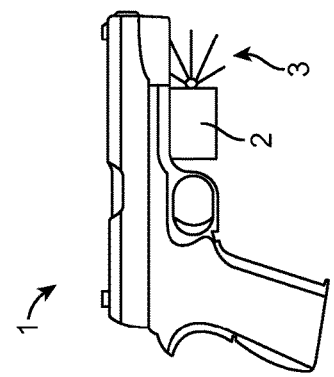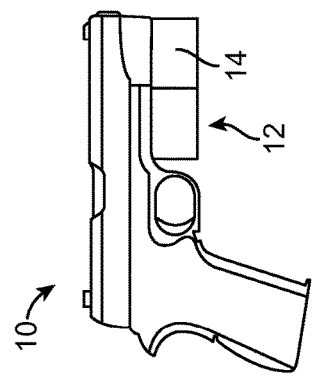
FIG. 1B
FIG. 2B
FIG. 1A
FIG. 2A

DEVICES FOR ELIMINATING POSITION DISCLOSING LIGHT EMITTED BY A LASER

CROSS SECTION TO RELATED APPLICATIONS

This application claims priority to and is a continuation of International Patent Application PCT/US2014/40525, titled "METHODS AND SYSTEMS FOR CONCEALING LIGHT," filed on Jun. 2, 2014, which claims priority to U.S. provisional application No. 61/830,101, titled "METHODS AND SYSTEMS FOR CONCEALING LIGHT," filed on Jun. 2, 2013 and to U.S. provisional application No. 61/893,208, titled "METHODS AND SYSTEMS FOR CONCEALING LIGHT," which are hereby incorporated by reference in their entirety for all purposes.

BACKGROUND

Field

The described technology relates to systems and methods of concealing light from accessories.

Description of the Related Technology

Accessories are frequently used to enhance the capability and usability of a weapon system. These accessories can include, for example, flashlights and sighting systems such as used with bows, crossbows, airguns, and firearms. A wide variety of sighting systems are used including iron sights, optical sights, electro-optical sights, and laser sights. Each of the listed sight types provides different advantages and disadvantages including, speed of target acquisition, speed of sighting, magnification, ruggedness, and reliability. These advantages and disadvantages complicate the selection of a sighting system for a weapon system as the selected sighting system affects the situations and environments in which the weapon system can be successfully and easily deployed. In light of this, new sighting methods and systems are required.

SUMMARY OF CERTAIN INVENTIVE ASPECTS

A first exemplary embodiment of the present disclosure relates to a device for preventing secondary light emitted by a laser sight from being seen. The device includes a cavity defined by a sidewall and first and second ends of a light containment structure. In some embodiments, the light containment structure is mountable so as to receive light from a laser sight of a weapon through a first opening located at the first end of the light containment structure. The device can include a first element located at the second end of the light containment structure, and a second opening defined by the first element and that can pass light from the cavity toward an object such that the object is illuminated to a user of the weapon by the light from the second opening. In some embodiments, the cavity can be configured such that light does not directly illuminate the sidewall.

In a second exemplary embodiment of the present disclosure, the device of the first exemplary embodiment of the present disclosure can include a second element located between the first opening and the second opening. In some embodiments, the second element can define a third opening, and can divide the cavity into a first cavity located between the first opening and the second element and a second cavity located between the second element and the first element. In a third exemplary embodiment of the present disclosure, the second element of the second exemplary embodiment of the present disclosure can be configured to prevent light from the laser sight from directly illuminating the sidewall of the second cavity.

A fourth exemplary embodiment of the present disclosure relates to a device for preventing secondary light emitted by a laser sight from being seen. The device includes a cavity defined by a sidewall and first and second ends of a light containment structure. The light containment structure is mountable so as to receive light from a laser sight of a weapon through a first opening located at the first end of the light containment structure. The device can include a first element located at the second end of the light containment structure, a second opening defined by the first element and configured to pass light from the cavity toward an object such that the object is illuminated to a user of the weapon by the light from the second opening, and a third opening located in one of the sidewall and the first element. In some embodiments, the third opening can drain a liquid from the light containment structure.

In a fifth exemplary embodiment of the present disclosure, the light containment structure of the fourth exemplary embodiment of the present disclosure is configured such that the third opening is not directly illuminated by light from the laser sight when light from the laser sight enters into the light containment structure via the first opening.

A sixth exemplary embodiment of the present disclosure relates to a device for preventing secondary light emitted by a laser sight from being seen. The device includes a cavity defined by a sidewall and first and second ends of a light containment structure. In some embodiments the light containment structure can be mounted so as to receive a first laser beam and a second laser beam from laser sight of a weapon through a first end of the light containment structure. The device can include a first element located at the second end of the light containment structure, a first opening defined by the first element and that can pass the first laser beam from the cavity and toward an object such that the object is illuminated to a user of the weapon by the first laser beam, and a second opening defined by the first element and that can pass the second laser beam from the cavity toward the object such that the object is illuminated to a user of the weapon by the second laser beam.

In a seventh exemplary embodiment of the present disclosure, the first and second openings of the device of the sixth exemplary embodiment of the present disclosure are configured such that light exits both the first and second openings when one of the first and second laser beams passes through the light containment structure. In an eighth exemplary embodiment of the present disclosure, the device of the seventh exemplary embodiment of the present disclosure includes a shield that can prevent light from exiting the one of the first and second openings when one of the first and second laser beams passes through the light containment structure. In a ninth exemplary embodiment of the present disclosure, the device of one of exemplary embodiments 1 through 8 includes a rail mount that can be detachably connected to a rail of a weapon.

In a tenth exemplary embodiment of the present disclosure, the device of one of exemplary embodiments 1 through 3 and 6 through 8 can include a drain hole. In an eleventh exemplary embodiment of the present disclosure, the device of the tenth exemplary embodiment can be sized and shaped such that the drain hole is not directly illuminated, by, for example, the laser sight.

A twelfth exemplary embodiment of the present disclosure relates to a sighting device. The sighting device includes a laser sight having an aperture through which a laser beam exits the laser sight and a light shield mounted to the laser sight. The light shield includes a mount detachably connected to the laser sight and that can hold the light shield in a mated position, a cavity defined by a sidewall and first and second ends of a light containment structure, where the light containment structure can receive light from the laser sight through a first opening located at the first end of the light containment structure, a first element located at the second end of the light containment structure, where the first element inwardly extends from the sidewall of the light containment structure, a second opening defined by the first element and that can pass light from the cavity toward an object such that the object is illuminated to a user of the weapon by the light from the second opening, and a mounting structure that can align the light shield with the aperture such that the laser beam can pass through the light shield.

In a thirteenth exemplary embodiment of the present disclosure, which can include the features of the twelfth exemplary embodiment of the present disclosure, the laser beam can pass through the light shield when the laser beam does not impinge on any element of the light shield. In a fourteenth exemplary embodiment of the present disclosure, which can include the features of the thirteenth exemplary embodiment, the laser beam does not impinge on any element of the light shield when a smallest circle encompassing at least 90% of the energy of the laser beam does not contact any element of the light shield.

In a fifteenth exemplary embodiment of the present disclosure, the device of exemplary embodiment twelve can include a weapon having a rail that is connected to the laser sight and a bump guard connected to the rail and extending around portions of the light shield between the first and second ends of the light containment structure. In a sixteenth exemplary embodiment of the present disclosure, the bump guard of the fifteenth exemplary embodiment does not contact the light containment structure.

A seventeenth exemplary embodiment of the present disclosure relates to a device that includes a weapon including a rail and a laser sight, and a light shield mounted to the rail. The light shield includes a rail mount detachably connecting the light shield to the weapon, a cavity defined by a sidewall and first and second ends of a light containment structure, where the light containment structure can receive light from the laser sight through a first opening located at the first end of the light containment structure, a first element located at the second end of the light containment structure, where the first element inwardly extends from the sidewall of the light containment structure, and a second opening defined by the first element and that can pass light from the cavity toward an object such that the object is illuminated to a user of the weapon by the light from the second opening.

In an eighteenth exemplary embodiment of the present disclosure, the light shield of the seventeenth exemplary embodiment is aligned with the laser sight such that a laser beam generated by the laser sight passes through the light containment structure without impinging on any portion of the light containment structure when the light shield is mounted to the rail.

In a nineteenth exemplary embodiment of the present disclosure, the sidewall of one of the first through eighth and twelfth through eighteenth exemplary embodiments includes at least one of a light absorptive material, a light absorptive coating, a light absorptive treatment, and a light absorptive texture. In a twentieth exemplary embodiment of the present disclosure, the sidewall of one of the first through eighth and twelfth through eighteenth exemplary embodiments includes a non-reflective surface. In a twenty-first exemplary embodiment of the present disclosure, the sidewall of one of the first through eighth and twelfth through eighteenth exemplary embodiments includes a plurality of angled portions configured to reflect light away from the first and second openings.

In a twenty-second exemplary embodiment of the present disclosure, in the device of one of the first through eighth and twelfth through eighteenth exemplary embodiments, the distance between the first and second ends is b, where the opening has a width which is equal to a, and where b divided by a is greater than 3. In a twenty-third exemplary embodiment of the present disclosure, in the device of one of the first through eighth and twelfth through eighteenth exemplary embodiments, substantially all light incident on the light containment structure is not visible to an observer 25 yards from the light containment structure. In a twenty-fourth exemplary embodiment of the present disclosure, in the device of one of the first through eighth and twelfth through eighteenth exemplary embodiments, substantially all light from the laser sight that does not pass directly from the laser sight through the opening is shielded by the light containment structure.

In a twenty-fifth exemplary embodiment of the present disclosure, the device of one of the first through eighth and twelfth through eighteenth exemplary embodiments includes a third element located at the first end of the light containment structure, where the third element extends inwardly from the sidewall of the light containment structure and bounds the first opening. In a twenty-sixth exemplary embodiment of the present disclosure, in the device of the twenty-fifth exemplary embodiment, the width of the second opening is larger than the width of the first opening. In a twenty-seventh exemplary embodiment of the present disclosure, in the device of one of the twelfth through eighteenth exemplary embodiments, the first opening has a first width and the second opening has a second width, where the first and second widths are configured to allow windage or elevation adjustment of a point of aim of the laser beam.

In a twenty-eighth exemplary embodiment of the present disclosure, in the device of the twenty-seventh exemplary embodiment, the first and second widths allow at least ten MOA of windage or elevation adjustment of the point of aim of the laser beam. In a twenty-ninth exemplary embodiment of the present disclosure, in the device of the twenty-fifth exemplary embodiment, the first and second widths allow at least twenty MOA of windage or elevation adjustment of the point of aim of the laser beam. In a thirtieth exemplary embodiment of the present disclosure, in the device of the twenty-seventh exemplary embodiment, the first and second widths allow at least forty MOA of windage or elevation adjustment of the point of aim of the laser beam.

BRIEF DESCRIPTION OF THE DRAWINGS

FIGS. 1A and 1B are side and top views of a weapon having a laser sight.

FIGS. 2A and 2B are side and top views of a weapon having a laser sight.

DETAILED DESCRIPTION OF CERTAIN EMBODIMENTS

Figure 3A:
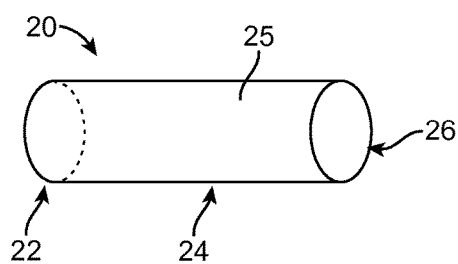
FIGS. 3A-3F illustrate embodiments of options of features for a light shield.

Various aspects and features of methods and devices are described herein with reference to the accompanying drawings, which show certain embodiments. The described embodiments may be modified in various ways, without departing from the spirit or scope of the present invention or inventions. In addition, the described embodiments have multiple features and aspects, no single one of which is solely responsible for the desirable characteristics of the embodiments. Furthermore, no single feature or aspect is essential to practicing the methods and systems described herein. Additionally, various features and aspects of the embodiments may be combined in embodiments not specifically described. For example, one or more features described with reference to one embodiment may be combined with one or more features described with reference to another embodiment.

Features and aspects of light shields, devices using light shields, and methods of using and making light shields are described herein. The described features and aspects are options for practical implementations of devices, systems, and methods. All operable combinations of the described features and aspects are contemplated and are explicitly disclosed by the present specification.

Various inventive aspects of certain embodiments of methods and devices for shielding undesired light from a light source of a weapon system, also referred to herein as a weapon, such as a hand gun, shotgun, sub-machinegun, machinegun, or a rifle, are discussed. The methods and devices allow desired light to illuminate an object of interest while suppressing undesired light, which would otherwise allow the location of the light source to be easily identified. The light may be visible light, or may be light outside the visible spectrum, for example, UV or IR light. Visibility or detectability or recognition of non-visible light may be achieved, for example, through use of a detection mechanism, such as night vision goggles, or another device which receives light outside the visible spectrum and generates a visible signal corresponding to the received light.

The methods and devices described herein address the tactical problem arising from the light signature of a laser sight. As discovered and disclosed herein, the use of a laser sight, and other light sources, illuminates the intended target of the light, but also creates light signature readily visible to individuals positioned forward of the front of the laser sight. Thus, an individual who is not the intended target of the laser sight is able to see the source of the laser light, and thereby identify the location of the user of the laser sight. This detectability of the position of the user of the laser sight eliminates and/or risks the elimination of tactical advantage possessed by the user of the laser sight.

Other light sources to which the methods, devices, and systems discussed herein may be applied include any laser or electromagnetic radiation source including, for example, radar sources, security illumination sources, tactical illumination sources, laser range-finders, laser communication devices, and flashlights. The methods, devices, and systems discussed herein may also be applied to other light sources.

FIG. 1A is a side view of a weapon 1 having a laser sight 2. Visible light from the laser sight 2 is indicated by light rays 3. As shown, in this embodiment, light from the laser sight 2 radiates in all directions forward of the laser sight 2.

FIG. 1B is a top view of weapon 1, which has laser sight 2 illuminating an object 5. Illumination of the object 5 is indicated by light rays 6. In addition to the light emitted from the laser sight 2 which illuminates the object 5, laser sight 2 also emits secondary light, which is visible light that illuminates unintended objects, things, and/or people. The secondary light is indicated by light rays 3. As shown, the secondary light 3 from laser sight 2 radiates and illuminates in all directions forward of the laser sight 2. For example, laser sight 2 undesireably illuminates weapon 1.

FIG. 2A is a side view of a weapon 10 having a laser sight 12. The weapon 10 also has a light shield 14 which prevents secondary light emitted by the laser sight 12 from being seen. In contrast with laser sight 2 of FIG. 1A, laser sight 12 of FIG. 2A emits no or substantially no secondary light that can be seen.

FIG. 2B is a top view of the weapon 10, which has laser sight 12 illuminating a target object 15. Illumination of the object 15 is indicated by light rays 16. The weapon 10 also has light shield 14 which reduces or eliminates any secondary light from laser sight 12. Accordingly, in contrast with weapon 1 of FIGS. 1A and 1B, from which secondary light is emitted, no or substantially no such secondary light is emitted from weapon 10. Accordingly, the light shield prevents the secondary light from undesireably illuminating objects other than the target object 15, such as the weapon 10 or part of the weapon 10.

FIGS. 3A-3F illustrate embodiments of options of features for a light shield. FIG. 3A illustrates optional features of a light shield 20 configured to receive light from a light source (not shown), such as a laser sight or a flashlight, at light entry location 22. Light from the light source which is used to illuminate an object passes through cavity 24 defined by light containment structure 25, and exits through opening 26. In some embodiments, opening 26 is sized according to an expected and/or desired beam of light from the light source. For example, opening 26 may be sized so as to be larger, just larger, approximately the same size as, or smaller than the beam. In addition, the opening 26 may be positioned such that the light of the beam passes through opening 26 without contacting the light containment structure.

The light received from the light source may leave the light source at a wide range of angles. Accordingly, the light received from the light source in a plane including the axis of the light containment structure 25 may be constrained to an arc of, for example, about 180°. Depending upon the light source, other arcs of constrainment are possible. Light exiting through the opening 26, however, is constrained to an arc which is less than the arc to which light from the light source is constrained.

In the embodiment shown in FIG. 3A, the shape of a cross section of the light containment structure 25 taken perpendicular to the general direction of the light traveling through light shield 20 at each of the light entry location 22, the cavity 24, and the opening 26 is circular. Other cross-sectional shapes may alternatively be used at one or more of the light entry location 22, the cavity 24, and the opening 26. For example, oval, rectangular, square, or other shapes may be used.

In some embodiments, the light containment structure 25 absorbs all or substantially all light from the light source which is incident thereon. In some embodiments, one or more surfaces of the light containment structure 25 receiving incident light from the light source are antireflective. For example, the light containment structure 25 receiving incident light from the light source may have one or more of a texture, a color, and an antireflective coating (ARC) which cause the incident light to be absorbed instead of being reflected or scattered.

As discussed above, in some embodiments, the texture of the surfaces of the light containment structure 25 may cause or help cause the incident light to be absorbed instead of being reflected or scattered. The texture of the surfaces of the light containment structure 25 may include one or more of pits, dimples, scratches, divots, dents, ridges, notches, bumps, protrusions, bristles, points, spines, whiskers, filaments, powder, carbon, charcoal, and flocking. Other texture features may additionally or alternatively be used. In some embodiments, one or more of a size, a spacing and an arrangement of the texture features is related to a wavelength of light expected to be incident on the surface having the texture features.

As discussed above, in some embodiments, the color of the surfaces of the light containment structure 25 may cause or help cause the incident light to be absorbed instead of being reflected or scattered. The color of the surfaces of the light containment structure 25 may have a color corresponding to a wavelength of light expected to be incident on the surface. For example, a particular coloring may be used for the surface, where the particular coloring causes the surface to absorb a certain wavelength of light. For example, red laser light having a wavelength of 650 nm may be effectively absorbed by certain colorings which, in white light, appear green. In addition, green laser light having a wavelength of 520 nm may be most effectively absorbed by certain colorings which, in white light, appear red.

As discussed above, in some embodiments, the surfaces of the light containment structure 25 may have an antireflective coating (ARC) which may cause or help cause the incident light to be absorbed instead of being reflected or scattered. The ARC may be one layer or may be multiple layers. In some embodiments, the ARC has one or more of a material and a dimension which are selected based on and corresponding with a wavelength of expected incident light.

In some embodiments, one or more of the material and the dimension are based on and correspond with an angle of incidence. In such embodiments, for example, the thickness of one or more ARC layers on the light containment structure 25 near the light entry location 22 may be different from the thickness of the one or more ARC layers on the light containment structure 25 near the opening 26.

In some embodiments, the ARC comprises paint, such as flat or matte black paint or paint comprising carbon.

Because all or substantially all of the light incident on the light containment structure is absorbed, all or substantially all of the light which exits through opening 26 travels directly from the light source, into the light shield 20 at light entry location 22, through cavity 25, and out of the light shield 20 through opening 26.

In the embodiment of FIG. 3A, the distance between the light entry location 22 and the opening 26 is B, and the diameter of the opening 26 is A. In some embodiments, A is greater than the corresponding dimension of the light source. All or substantially all of the light exiting through opening 26 in a plane may be confined to an arc of less than 2× arctan(A/B). In some embodiments, B/A is greater than 3, equal to about 3, about 4, about 8, about 16, about 32, about 64, about 128, about 256, or about 512. Other values of B/A may be used. For example, B/A may be less than 3 or maybe greater than 512. Accordingly, all or substantially all of the light exiting through opening 26 in a plane may be confined to an arc of less than about 120°, about 90°, about 60°, about 45°, about 30°, about 15°, about 10°, about 5°, about 2°, or about 1°, according to B/A. In some embodiments, all or substantially all of the light exiting through opening 26 in a plane is confined to an arc of less than a different number of degrees. For example, all or substantially all of the light exiting through the opening 26 in a plane is confined to an arc of less than a number of degrees greater than 120° or less than 1°.

Because all or substantially all light exiting through the opening 26 in a plane is confined to an arc, no or substantially no light is visible outside the arc. Accordingly, an observer within the arc would be illuminated by the light source, and would receive enough light to be able to recognize the presence of the light source, for example, while stationary relative to the light source, while moving relative to the light source, or while having eyes moving relative to the light source. And the observer, outside the arc, would not receive enough light to be able to recognize the presence of the light source, for example, while stationary relative to the light source, while moving relative to the light source, or while having eyes moving relative to the light source.

In some embodiments, depending on the light source, light within the arc may be greater than about 1 $cd/m^2$, about 10 $cd/m^2$, about 100 $cd/m^2$, about $10^3$ $cd/m^2$, about $10^4$ $cd/m^2$, about $10^5$ $cd/m^2$, or about $10^6$ $cd/m^2$. In some embodiments, depending on the light source, light outside the arc may be less than about 1 $cd/m^2$, about 0.1 $cd/m^2$, about 0.001 $cd/m^2$, about $10^{-3}$ $cd/m^2$, about $10^{-4}$ $cd/m^2$, about $10^{-5}$ $cd/m^2$, about $10^{-6}$ $cd/m^2$, about $10^{-7}$ $cd/m^2$, about $10^{-8}$ $cd/m^2$, or about $10^{-9}$ $cd/m^2$. In some embodiments, the ratio of light ($cd/m^2$) within the arc to light outside the arc may be greater than about 10, about 100, about $10^3$, about $10^4$, about $10^5$, about $10^6$, about $10^7$, about $10^8$, or about $10^9$.

In some embodiments, depending on the light source, an observer within the arc would be illuminated by the light source and would receive enough light to be able to recognize the presence of the light source at a distance greater than about 10 yds or m, 15 yds or m, 20 yds or m, 25 yds or m, 35 yds or m, 50 yds or m, 75 yds or m, 100 yds or m, 150 yds or m, 200 yds or m, 250 yds or m, or 500 yds or m, for example, while stationary relative to the light source, while moving relative to the light source, or while having eyes moving relative to the light source. In some embodiments, depending on the light source, the observer, outside the arc, would not receive enough light to be able to recognize the presence of the light source at a distance less than 100 yds or m, 75 yds or m, 50 yds or m, 25 yds or m, 20 yds or m, 15 yds or m, 10 yds or m, 5 yds or m, 4 yds or m, 3 yds or m, 2 yds or m, 1 yd or m, 0.5 yds or m, for example, while stationary relative to the light source, while moving relative to the light source, or while having eyes moving relative to the light source. In some embodiments, the ratio of A) the shortest distance at which the observer, within the arc, would not receive enough light to be able to recognize the presence of the light source to B) the greatest distance at which the observer outside the arc would receive enough light to be able to recognize the presence of the light source is about 2, about 5, about 10, about 25, about 50, about 100, about 200, about 500, or about 1000.

In some embodiments, the portion of light energy exiting from the opening 26 within the arc is greater than about 90%, about 95%, about 98%, about 99%, about 99.9%, about 99.99%, about 99.999%, about 99.9999%, about 99.99999%, or about 99.999999%. Correspondingly, the portion of light energy exiting from the opening 26 outside the arc may be less than about 10%, about 5%, about 2%, about 1%, about 0.1%, about 0.01%, about 0.001%, about 0.0001%, about 0.00001%, about 0.000001%, or about 0.0000001%.

Figure 3B:
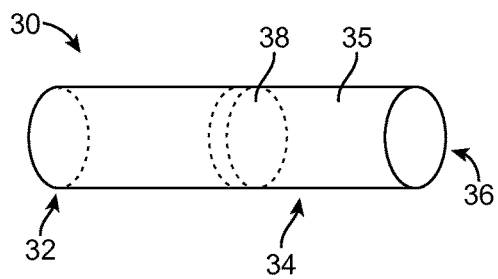

FIG. 3B illustrates a light shield 30 configured to receive light from a light source, such as a laser sight or a flashlight, at light entry location 32. Light from the light source which is used to illuminate an object passes through cavity 34 defined by light containment structure 35, and exits through opening 36. Light shield 30 also includes filter 38.

Filter 38 is located within cavity 34 and prevents some of the light entering cavity 34 from exiting through opening 36. Accordingly, filter 38 reduces the total amount of light exiting through opening 36. Because the secondary light is reduced, the location of the weapon is less likely to be revealed by the secondary light. Filter 38 allows sufficient light to exit through opening 36 so that an object of interest may be illuminated, where the object is, for example, more than about 10 yards, about 25 yards, about 50 yards, or about 100 yards from the light shield 30. Filter 38 can block light of one or several specified wavelengths and/or polarities.

Figure 3C:
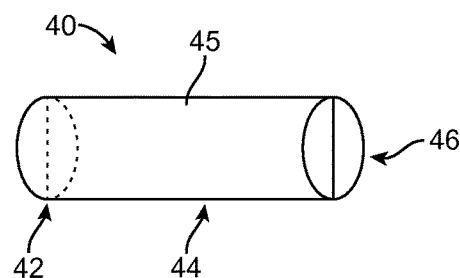

FIG. 3C illustrates a light shield 40 configured to receive light from a light source, such as a laser sight or a flashlight, at light entry location 42. Light from the light source which is used to illuminate an object passes through cavities 44 defined by light containment structure 45, and exits through openings 46. As shown, light shield 40 includes multiple cavities 44 and multiple openings 46.

Similar to that discussed above, with reference to FIG. 3A, the arcs to which light exiting the openings 46 are constrained, are based on a ratio of the distance between the openings 46 and the light source, and a width of the openings 46. In this embodiment, because the openings 46 are smaller than that which could be implemented with a light containment structure of the same length, the arcs to which the light exiting the openings 46 are constrained, are smaller.

Figure 3D:
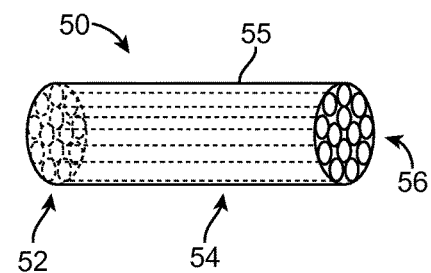

FIG. 3D illustrates a light shield 50 configured to receive light from a light source, such as a laser sight or a flashlight, at light entry location 52. Light from the light source which is used to illuminate an object passes through cavities 54 defined by light containment structure 55, and exits through openings 56. In the embodiment depicted in FIG. 3D, the cavities 54 can be bound by a series of parallel members such as a series of parallel tubes and/or a series of light guides such as fiber optics. As shown, light shield 50 includes many cavities 54 and multiple openings 56.

Similar to that discussed above, with reference to FIG. 3C, the arcs to which light exiting the openings 56 are constrained, are based on a ratio of the distance between the openings 56 and the light source, and a width of the openings 56. Accordingly, the light exiting the openings 56 may be constrained to arcs which are very small.

Figure 3E:
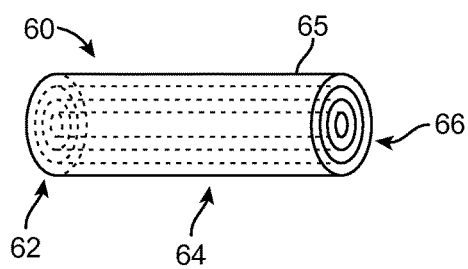
Figure 3F:
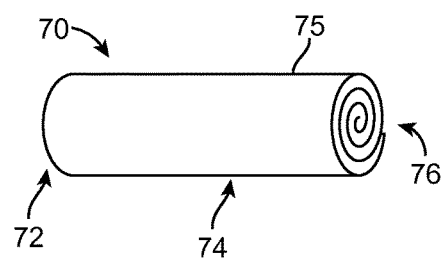

FIGS. 3E and 3F illustrate alternative embodiments which have small openings to achieve small arcs.

FIG. 3E illustrates a light shield 60 configured to receive light from a light source, such as a laser sight or a flashlight, at light entry location 62. Light from the light source which is used to illuminate an object passes through cavities 64 defined by light containment structure 65, and exits through openings 66. As shown, light shield 60 includes many cavities 64 and multiple openings 66. In this embodiment, the cavities are substantially concentric.

FIG. 3F illustrates a light shield 70 configured to receive light from a light source, such as a laser sight or a flashlight, at light entry location 72. Light from the light source which is used to illuminate an object passes through cavity 74 defined by light containment structure 75, and exits through opening 76. As shown, light containment structure 75 defines a spiral shaped cavity 74 and a spiral shaped opening 76.

In some embodiments, a light shield may include any operable combination of the light shield features illustrated in FIGS. 3E-3F and shown or described elsewhere herein.

Figure 4A:
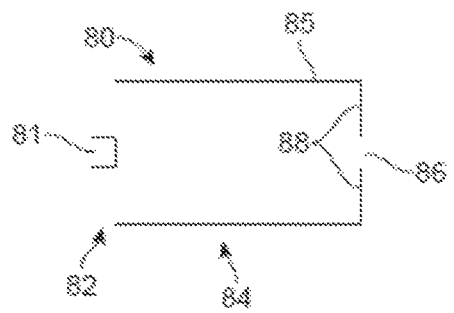
FIGS. 4A-4E illustrate cross-sectional views of embodiments of options of features for a light shield.

FIGS. 4A-4E illustrate cross-sectional views of embodiments of options of features for a light shield. FIG. 4A shows a cross-section of a light shield 80. In this embodiment, light from a light source 81 is received by light shield 80 at light entry location 82. Light from the light source 81 which is used to illuminate an object passes through cavity 84 defined by light containment structure 85 and exits through opening 86.

In this embodiment, light containment structure 85 includes element 88 which bounds opening 86. In this embodiment, the element 88 is substantially perpendicular to the general direction of light traveling through light shield 80. As shown, in this embodiment, a cross-sectional dimension of the cavity 84 is greater than the size of the opening 86.

Figure 4B:
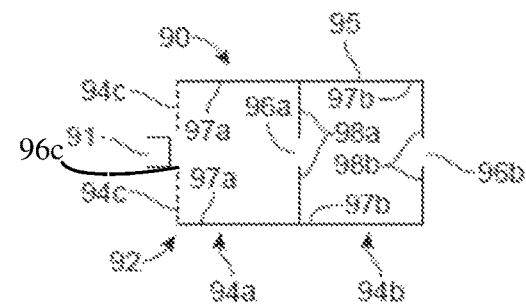

FIG. 4B shows a cross-section of a light shield 90. In this embodiment, light from a light source 91 is received by light shield 90 at light entry location 92. Light from the light source 91 which is used to illuminate an object passes through cavities 94a and 94b defined by light containment structure 95. Light used to illuminate the object passes from cavity 94a through opening 96a to cavity 94b, and exits light shield 90 through opening 96b.

In this embodiment, light shield 90 includes two cavities 94a and 94b in series. Each of the cavities 94a and 94b is configured to receive light, to absorb a portion of the received light, and to pass a portion of the received light through an opening 96a or 96b.

In this embodiment, light containment structure 95 includes elements 98a and 98b which respectively bound openings 96a and 96b. In this embodiment, the elements 98a and 98b are substantially perpendicular to the general direction of light traveling through light shield 90. As shown, in this embodiment, a cross-sectional dimension of the cavities 94a and 94b is greater than the size of the openings 96a and 96b.

In addition, light shield 90 includes optional element 94c which is adjacent to the light source 91. Optional element 94c includes opening 96c, through which light passes from light source 91 to cavity 94a.

In some embodiments, openings 96a, 96b, and 96c are the same size. In alternative embodiments, openings 96a, 96b, and 96c are different sizes. In some embodiments, opening 96b is larger than opening 96a. In some embodiments, opening 96a is larger than opening 96c. In some embodiments, openings 96a, 96b, and 96c have a size corresponding with an expected beam of light from the light source 91. For example, openings 96a, 96b, and 96c may be sized so as to be larger, just larger, or about the same size as the beam. In addition, the openings 96a, 96b, and 96c may be positioned such that the light of the beam passes through openings 96a, 96b, and 96c without contacting or impinging on the light containment structure.

Some light sources have adjustable directionality. For example, some laser sights have windage and elevation adjustments. In some embodiments, the openings 96a, 96b, and 96c have sizes which correspond with the adjustment ranges, such that they are sized such that light of the beam passes through the openings 96a, 96b, and 96c even at the extremes of the adjustment ranges. In some embodiments, the openings 96a, 96b, and 96c have sizes which correspond with at least 10, 20, 40, or 80 minutes of angle (MOA) of adjustment.

In this embodiment, element 98a of light containment structure 95 prevents light from light source 91 from shining directly on sidewall 97b. In addition, element 98a of light containment structure 95 prevents light shown on sidewall 97a from passing directly from sidewall 97a through opening 96b. Accordingly, while sidewall 97a receives light directly from light source 91, because of element 98a, sidewall 97a is not visible from opening 96b. In addition, while sidewall 97b is visible from opening 96b, because of element 98a, sidewall 97b receives no light directly from light source 91. Accordingly, in this embodiment, there are no surfaces which receive light directly from light source 91 and which are visible from the opening 96b, with the exception of the boundaries of the openings 96a and 96b.

Figure 4C:
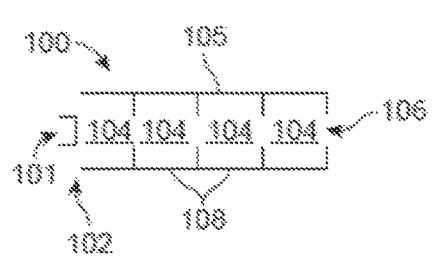

FIG. 4C shows a cross-section of a light shield 100. In this embodiment, light from a light source 101 is received by light shield 100 at light entry location 102. Light from the light source 101 which is used to illuminate an object passes through cavities 104 defined by light containment structure 105. Light used to illuminate the object passes from cavity to cavity, and exits light shield 100 through opening 106. In other embodiments, different numbers of cavities and openings are used.

In this embodiment, elements 108 of light containment structure 105 prevent light from light source 101 from shining directly on surfaces of light containment structure 105 which are visible from opening 106. In addition, elements 108 of light containment structure 105 prevent surfaces of light containment structure 105 which receive light directly from the light source 100 from being visible from opening 106. Accordingly, in this embodiment, there are no surfaces which receive light directly from light source 101 and which are visible from the opening 106, with the exception of the boundaries of the openings between cavities 104 and the opening 106.

Figure 4D:
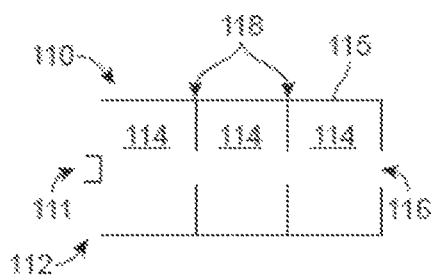

FIG. 4D shows a cross-section of a light shield 110. In this embodiment, light from a light source 111 is received by light shield 110 at light entry location 112. Light from the light source 111 which is used to illuminate an object passes through cavities 114 defined by light containment structure 115. Light used to illuminate the object passes from cavity to cavity, and exits light shield 110 through opening 116. In other embodiments, different numbers of cavities and openings are used.

In this embodiment, elements 118 of light containment structure 115 prevent light from light source 111 from shining directly on surfaces of light containment structure 115 which are visible from opening 116. In addition, elements 118 of light containment structure 115 prevent surfaces of light containment structure 115 which receive light directly from the light source 110 from being visible from opening 116. Accordingly, in this embodiment, there are no surfaces which receive light directly from light source 111 and which are visible from the opening 116, with the exception of the boundaries of the openings between cavities. In this embodiment, the boundary of opening 116 does not receive light directly from the light source 111 because it is in the shadow of elements 118.

Figure 4E:
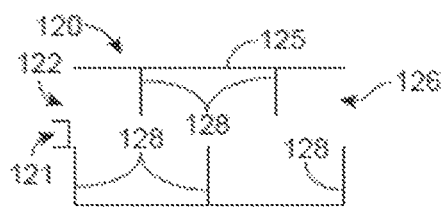

FIG. 4E shows a cross-section of a light shield 120. In this embodiment, light from a light source 121 is received by light shield 120 at light entry location 122. Light from the light source 121 which is used to illuminate an object passes through light containment structure 125 and exits light shield 120 through opening 126. In this embodiment, light travels from the light source 121 to opening 126 through a channel bounded and at least partly defined by an element 128 of light containment structure 125. In this embodiment, element 128 of light containment structure 125 is substantially helical. In some embodiments, opening 126 is completely bounded by a portion of light containment structure substantially perpendicular to the general direction of the light. This is not shown in FIG. 4E.

In some embodiments, a light shield may include any operable combination of the light shield features illustrated in 4A-4D and shown or described elsewhere herein.

In some embodiments, a structure (not shown) having an opening may be placed apart from a light source such that light from the light source for illuminating an object passes through the opening of the structure and such that light from the light source outside the opening of the structure is prevented by the structure from passing beyond the structure.

For example, a light source and a light shield, such as that shown or discussed elsewhere herein, may be mounted on a weapon, such as a rifle. In addition, the light shield may have an additional element, such as a plate, separately mounted on the rifle so as to be spaced a distance apart from the remainder of the light shield. In this example, the plate extends the effective length of the light shield, and correspondingly reduces the arc of light visible from the light source. Light from the light source passes through the remainder of the light shield and through an opening in the plate to illuminate an object of interest at a distance. In addition, secondary light is blocked by the plate. As a result, all or substantially all of the light exiting through the plate opening in a plane is confined to an arc based on the size of the plate opening in the plane and based on the distance between the plate opening and the light source. In some embodiments, the plate has a shape corresponding to the shape of an opening in the remainder of the light shield.

The plate may have features similar to those discussed above with reference to light containment structures. For example, the plate may have an antireflective surface reducing or preventing the blocked light from illuminating the plate to an observer behind the rifle. Additionally or alternatively, the portion of the plate bounding the plate opening may have features similar to corresponding portions of light containment structures discussed above. In some embodiments, the plate alone forms an effective light shield, such that the remainder of the light shield discussed above is not used.

In some embodiments, a light shield can be used with a light source which is not or which is not directly associated with a weapon. For example, a flashlight, such as an LED flashlight, may include a light shield so that the location of the flashlight may be concealed from observers outside the arc of light emitted from the light shield.

In some embodiments, a light shield is configured to open, for example so that the internal structures are conveniently accessible for service, such as cleaning, maintenance, or repair. For example, the light containment structure may have a hinge and a latch which may be used to open and close two sections of the light containment structure.

Figure 5:
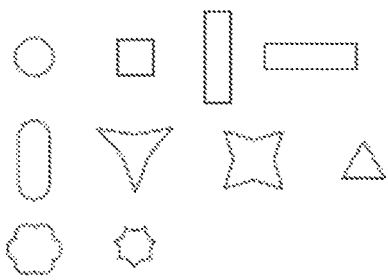
FIG. 5 illustrates options of shapes which may be used for one or more openings in a light containment structure.

The shape of the opening in a light containment structure may, for example, be circular. The embodiments of light containment structures illustrated herein are illustrated with openings having a specific shape. Other shape options may alternatively be used. For example, oval, rectangular, square, or other shapes may be used. FIG. 5 illustrates several options of shapes which may be used for one or more openings in a light containment structure.

In some embodiments, a light shield may include any operable combination of any of the light shield features illustrated in FIG. 5 and shown or described elsewhere herein.

Figure 6:
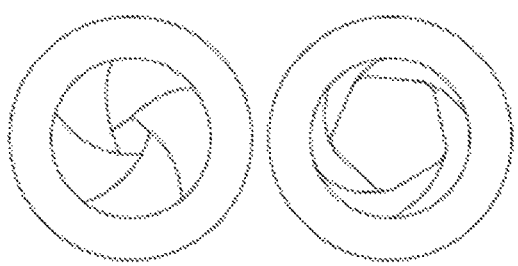
FIG. 6 illustrates options of an adjustable opening.

FIG. 6 illustrates an adjustable opening. In some embodiments, one or more openings in a light containment structure may be adjustable. For example, a blade adjustable mechanism, such as that illustrated in FIG. 6 may be used at one or more openings in a light containment structure.

In some embodiments, a light shield may include any operable combination of any of the light shield features illustrated in FIG. 6 and elsewhere herein.

Figure 7:
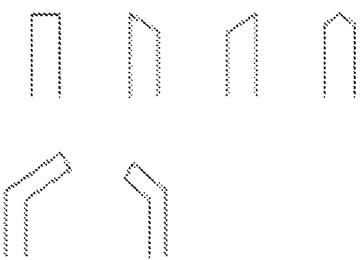
FIG. 7 illustrates options of cross-sectional shapes for the portion of a light containment structure which bounds an opening.

FIG. 7 illustrates a number of optional cross-section shapes for the element of a light containment structure bounding an opening. The boundary of an opening may present a surface or an edge which receives light directly from the light source and which is visible from the opening through which light exits the light shield. Accordingly, it may be advantageous to minimize the area of the surface or edge.

In some embodiments, the portion of the light containment structure which bounds an opening may taper such that it is thinner at or near the opening than elsewhere. In some embodiments, the cross-sectional profile of the taper is consistent near the boundary for all cross-sections taken perpendicular to the boundary. For example, the cross-sectional profile of the taper may be substantially identical for all cross-sections taken perpendicular to the boundary for at least $1/32^{nd}$ of an inch. In some embodiments, the portion of the light containment structure bounding an opening may be generally about $1/8^{th}$ inch thick, and may taper from the general thickness to a sharp edge at the boundary. In some embodiments, the edge may be razor-sharp.

In some embodiments, the tapering to the edge results in a tapered surface, which bounds the opening and is between first and second surfaces of the element, where the first surface is closest to the light source and the second surface is farthest from the light source. In such embodiments, the edge may be substantially aligned with the first surface of the element. In some embodiments, the tapered surface does not receive light directly from the light source because it is in the shadow of the element.

The element of the light containment structure which bounds an opening may have a surface which receives light directly from the light source and which is visible from the opening through which light exits the light shield. In some embodiments, the length of the surface, along the general direction of light, is less than about 1 mm, about 0.1 mm, about 0.01 mm, about 1 μm, about 0.1 μm, about 0.01 μm, or about 0.001 μm.

Some devices include multiple light sources. For such devices, a light shield may have one or more openings through which light from the multiple light sources passes. For example, a device may have 2, 3, 4, or more light sources, and a light shield for the device may have one or more openings through which light emanating from more than one of the 2, 3, 4, or more light sources passes. In some embodiments, a light shield may include one or more openings through which light emanating from only one of the 2, 3, 4, or more light sources passes.

Similarly, for devices including multiple light sources, a light shield may have one or more cavities through which light from the multiple light sources passes. For example, a device may have 2, 3, 4, or more light sources, and a light shield for the device may have one or more cavities through which light emanating from more than one of the 2, 3, 4, or more light sources passes. In some embodiments, a light shield may include one or more cavities through which light emanating from only one of the 2, 3, 4, or more light sources passes.

In some embodiments, a cavity of a light shield may be bounded by multiple openings, where light from a different light source passes through each of the multiple openings. In some embodiments, a light shield may include any operable combination of this feature and any of the light shield features shown or discussed elsewhere herein.

Figure 8A:
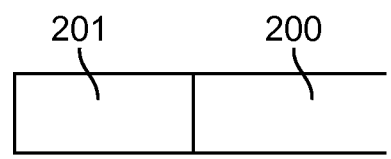
FIGS. 8A and 8B illustrate embodiments of options of features for a light source having an integrated light shield.
Figure 8B:
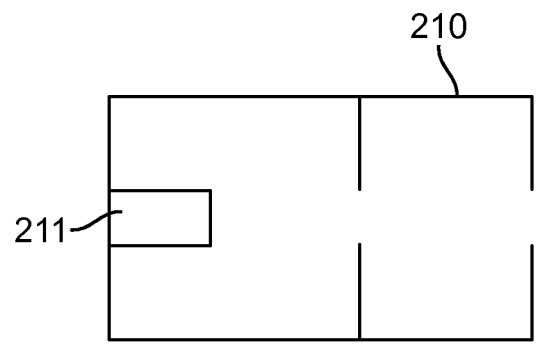

In some embodiments, one or more aspects or features of the embodiments discussed herein may be integrated with a light source or a housing of a light source. For example, FIG. 8A illustrates a light source 201 having an integrated light shield 200. FIG. 8B illustrates a light source 211 having a light shield 210 integrated with the housing of the light source 211. In other embodiments, one or more other aspects and features of the embodiments of light shields discussed herein may additionally or alternatively be integrated with a light source or the housing of a light source.

Figure 9A:
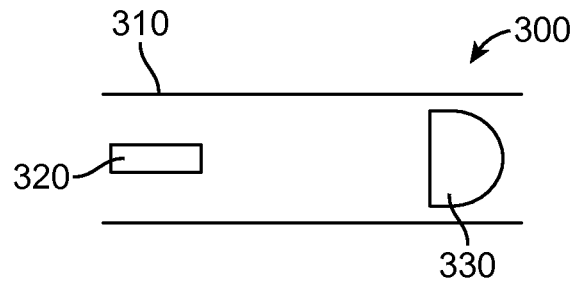
FIG. 9A-9C illustrate embodiments of options of features for a laser generator.

In some embodiments, one or more aspects or features of the embodiments discussed herein may be integrated within a light source. For example, FIG. 9A illustrates a laser generator 300 for a laser sight. Laser generator 300 includes laser diode 320, light channel 310, and collimating lens 330.

Laser diode 320 generates laser light. In some embodiments, a laser source other than a laser diode is used. Some of the laser light generated travels directly from the laser diode 320 through light channel 310 to collimating lens 330. Collimating lens 330 has a focal length which causes the light received directly from the laser diode 320 to be substantially collimated. As a result, the collimated light leaving the lens forms a beam. Some of the laser light generated by laser diode 320 travels from the laser diode 320 to the collimating lens 330 after being reflected or scattered one or more times from light channel 310. Such laser light traveling indirectly from the laser diode 320 through light channel 310 to collimating lens 330 is not collimated, and is a source of secondary light which is preferably suppressed.

In some embodiments, the light channel 310 is configured to absorb all or substantially all light from the laser diode 320 which is incident thereon. In some embodiments, one or more surfaces of the light channel 310 receiving incident light from the light source is antireflective. For example, the light channel 310 receiving incident light from the laser diode 320 may have one or more of a texture, a color, and an antireflective coating (ARC) which causes the incident light to be absorbed instead of being reflected or scattered. For example, light channel 310 may have one or more of a texture, a color, and an ARC, such as those described above.

In some embodiments, the laser generator 300 also includes a spring (not shown) in the light channel 310, where the collimating lens 330 is between the spring and a nut. In such embodiments, the nut can be turned to adjust the placement of the collimating lens 330 with respect to the laser source 320, for example so that the laser source 320 is at the focal point of the collimating lens 330.

In some embodiments, the spring is configured to absorb all or substantially all light from the laser source 320 which is incident thereon. In some embodiments, one or more surfaces of the spring receiving incident light from the light source is antireflective. For example, the spring may have one or more of a texture, a color, and an antireflective coating (ARC) which causes the incident light to be absorbed instead of being reflected or scattered. For example, the spring may have one or more of a texture, a color, and an ARC, such as those described above.

In some embodiments, collimating lens 330 is formed of a material and/or may be processed, for example, by polishing, to minimize scattering of the light passing therethrough. For example, collimating lens 330 may be made of a low-scatter plastic, glass, crystal, quartz, or another material.

Figure 9B:
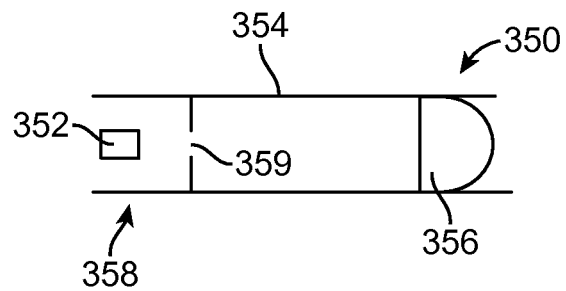

FIG. 9B illustrates a laser generator 350 having one or more aspects or features of the embodiments discussed herein. Laser generator 350 includes laser diode 352, light channel 354, and collimating lens 356. Laser generator 350 also includes light containment structure 358 having an opening 359.

Figure 9C:
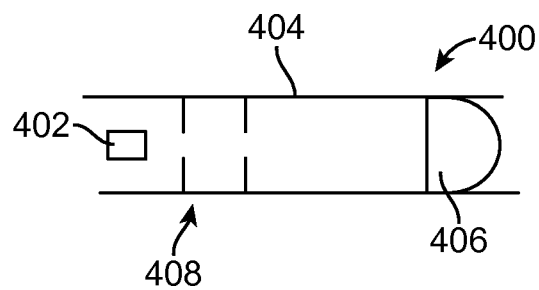

FIG. 9C illustrates another embodiment of a laser generator. Laser generator 400 includes laser diode 402, light channel 404, and collimating lens 406. Laser generator 400 also includes an integrated light containment structure 408.

Other embodiments of laser generators include light containment structures having other features or aspects discussed herein.

Laser generators having features and aspects discussed herein may be made using techniques and processes which are known in the art. In some embodiments, a laser generator may be formed, for example, by attaching a light channel having one or more features discussed above to a laser diode, and subsequently placing and securing a lens in the light channel. In some embodiments, securing the lens in the light channel includes placing a spring in the light channel, placing the lens in the light channel, placing a nut in the light channel, and turning the nut to secure the spring so that the lens is a desired distance from the laser source. Other methods to make a laser generator or to secure the lens may also be used.

The light shields and light sources having integrated light shields discussed herein may be manufactured using techniques known in the art. For example, in some embodiments of light shields are formed of plastic using an injection molding process. Alternatively, in some embodiments, light shields are formed of plastic or another material, such as a metal using a 3-D printing process. In some embodiments, portions of light containment structures bounding openings are formed separately from sidewalls, and are subsequently connected to sidewalls. For example, portions of light containment structures bounding openings which include razor-sharp edges may be formed and processed, for example, by grinding and/or polishing, to include the razor-sharp edge prior to an assembly process during which portions are connected to sidewalls.

Figure 10:
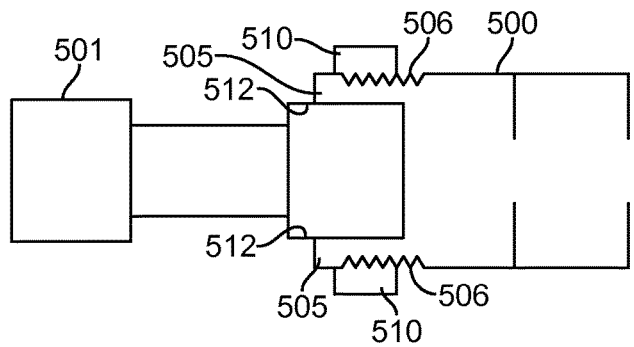
FIG. 10 is a cross-sectional diagram illustrating embodiments of options of features for a light shield attached to a light source.

FIG. 10 is a cross-sectional diagram of a light shield 500 which is attached to light source 501. Other attachment mechanisms may be used. In this embodiment, light shield 500 has a plurality of inwardly flexible extensions 505 each having a threaded element 506. Distal portions of extensions 505 have greater thickness than proximal portions. A threaded nut 510 engages the threaded elements 506 of the flexible extensions 505. Turning the nut 510 causes the nut 510 to slide along extensions 505 causing lateral elements 512 of the extensions 505 to frictionally engage with light source 501. This causes light shield 500 to be fixed too light source 501 in response to a force applied to the nut 510. In some embodiments, a light shield may include any operable combination of any of the light shield features illustrated in FIG. 10 and discussed or shown elsewhere herein.

Figure 11:
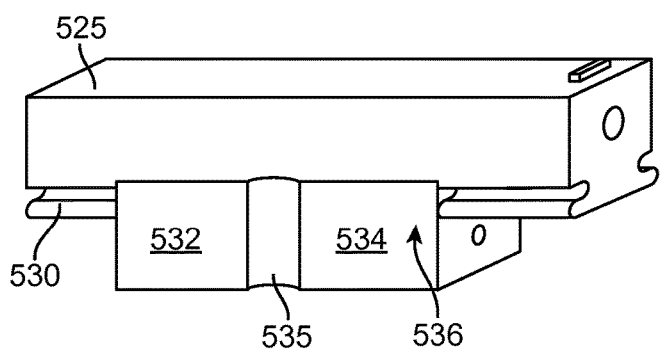
FIG. 11 is a perspective view of a weapon having a rail illustrating embodiments of options of features for a light shield.

Weapons often have rails by which accessories are attached. For example, a weapon may have a Picatinny and/or a Weaver rail. FIG. 11 is a perspective view of a weapon 525 having a rail 530. Attached to the rail is light source 532 and light shield 534. Between light source 532 and light shield 534 is an optional gasket 535. The gasket 535 prevents light from the light source 500 from escaping at the junction between the light shield 534 and the light source 532. As shown, the light shield 534 has an attachment structure 536 which is configured to engage the rail 530, and by which the light shield 534 is attached to the rail 530. In some embodiments, the gasket 532 is omitted. Accordingly, embodiments of light shields which are mounted to a rail, accessorize another rail mounted accessory—a laser sight.

Figure 12:
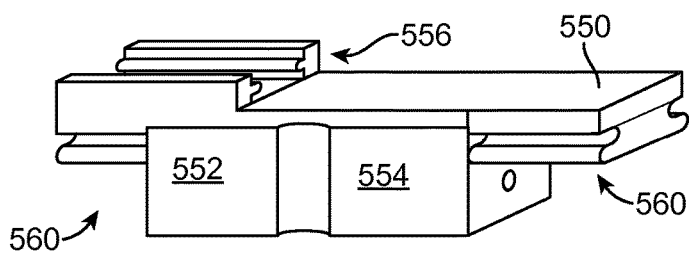
FIGS. 12-14 illustrate embodiments of a rail extension.

In some situations, a weapon may not have sufficient unused rail space available to accommodate a light shield. In order to attach a light shield to such a weapon, a rail extension may be used. FIG. 12 illustrates an embodiment of a rail extension 550 to which has been attached light source 552 and light shield 554. As shown, rail extension 550 includes an attachment structure 556 which is configured to engage a rail on a weapon, such as rail 530 of FIG. 11. Rail extension 550 also includes a rail 560. As shown, the rail 560 extends beyond and is longer than attachment structure 556.

In some embodiments, rail 560 is the same type as that to which attachment structure 556 is configured to attach. For example, rail 560 may be a Picatinny rail, and attachment structure 506 may be configured to attach to a Picatinny rail. In some embodiments, rail 560 is not the same type as that to which attachment structure 556 is configured to attach. The attachment of light source 552 and light shield 554 to rail 560 may be similar to the attachment of light source 532 and light shield 534 to rail 530, shown in FIG. 11.

Figure 13:
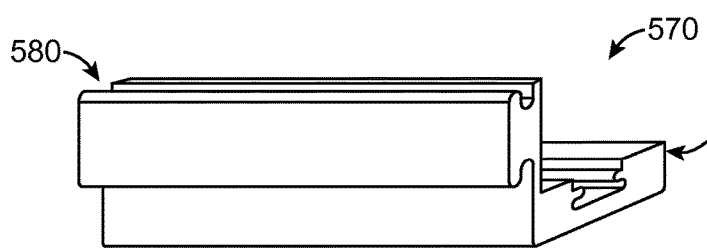

FIG. 13 illustrates an alternative embodiment of a rail extension. In this embodiment, rail extension 570 includes attachment structure 576 and rail 580, where attachment structure 576 and rail 580 are configured to face a weapon from different angles. As shown, the rail 580 extends beyond and is longer than attachment structure 576.

Figure 14:
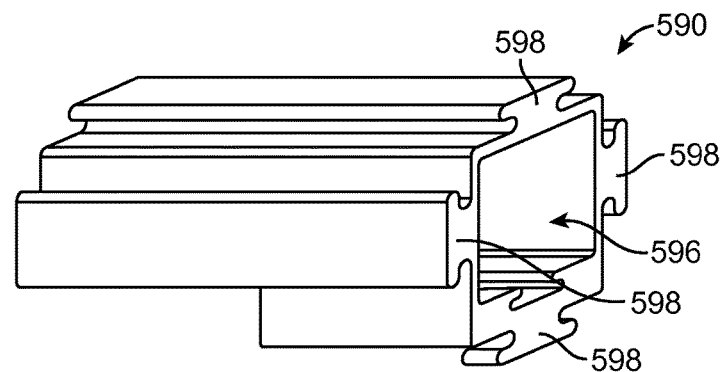

FIG. 14 illustrates an alternative embodiment of a rail extension. In this embodiment, rail extension 590 includes attachment structure 596 and multiple rails 598, where rails 598 are configured to face a weapon from various angles. In this embodiment, the rails 598 are configured to surround the weapon, and are sized and spaced so as to provide sufficient clearance between the weapon and the rails 598 so that operation of a sight or one or more other devices is not impeded by the rail extension 590. As shown, the rails 598 extend beyond and are longer than attachment structure 596.

Figure 15:
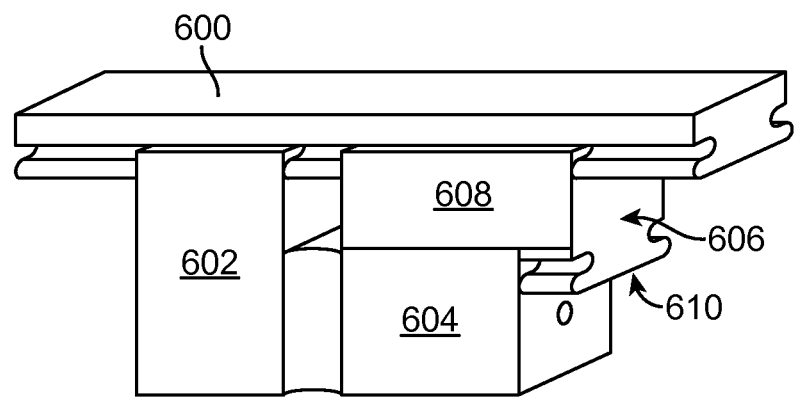
FIG. 15 illustrates a light shield attached to a rail with a rail spacer.

In order for a light shield to effectively produce desired results, it should be properly aligned with the light source. If attachment of a light shield directly to a rail to which a light source is attached does not provide proper alignment, a rail spacer may be used. FIG. 15 illustrates such an arrangement having a spacer.

In FIG. 15, light source 602 is attached to rail 600. In addition, light shield 604 is attached to rail 600 with a rail spacer 608. Vertical alignment between light source 602 and light shield 604 is achieved through the use of a rail spacer 608 having an appropriate vertical size.

As shown, rail spacer 608 has an attachment structure 606 by which rail spacer 608 attaches to rail 600. In addition rail spacer 608 has a rail 610 by which light shield 604 attaches to rail spacer 608.

Figure 16:
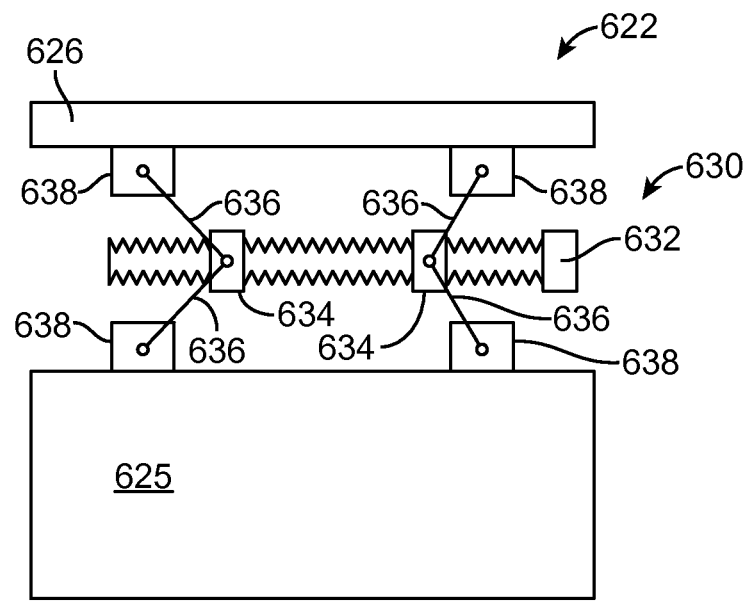
FIGS. 16 and 17 illustrate embodiments of options of features for light shields having alignment mechanisms.

FIG. 16 illustrates an embodiment of a light shield 622 including a vertical alignment mechanism 630. Light shield 622 includes light containment structure 625 which is attached to attachment structure 626 through alignment mechanism 630. Attachment structure 626 is configured to attach to a rail (not shown). Other vertical alignment mechanisms may be used.

Alignment mechanism 630 has screw 632 engaging nuts 634, which are connected to pivot arms 636. Pivot arms 636 are pivotally connected to nuts 634 and to attachments 638. Attachments 638 are fixed to light containment structure 625 and attachment structure 626.

Turning screw 632 causes the relative distance between nuts 634 to change. As nuts 634 are drawn closer to one another, pivot arms 636 rotate causing the distance between light containment structure 625 and attachment structure 626 to reduce. As nuts 634 are forced farther apart, pivot arms 636 rotate causing the distance between light containment structure 625 and attachment structure 626 to increase.

In some embodiments, a light shield may include any operable combination of any of the light shield features illustrated in FIG. 16 and shown or discussed elsewhere herein.

Figure 17:
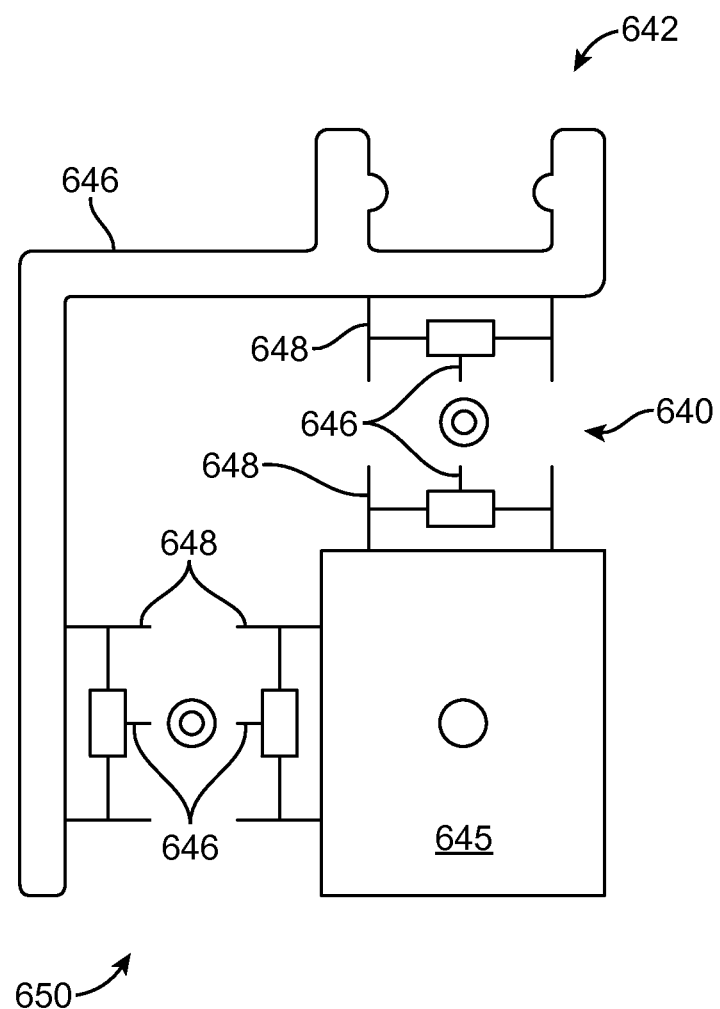

FIG. 17 illustrates an embodiment of a light shield 642 having a vertical alignment mechanism 640 and a horizontal alignment mechanism 650 by which light containment structure 645 is attached to attachment structure 646.

Vertical and horizontal alignment mechanisms 640 and 650 may be similar to alignment mechanism 630 discussed above with reference to FIG. 16. In vertical and horizontal alignment mechanisms 640 and 650, pivot arms 646 pivotably and slidably connect to attachments 648 which are fixed to light containment structure 645 and attachment structure 646.

While vertical alignment is adjusted with vertical alignment mechanism 640, pivot arms 646 of horizontal alignment mechanism 650 slide vertically in accordance with the vertical adjustment. Likewise, while horizontal alignment is adjusted with horizontal alignment mechanism 650, pivot arms 646 of vertical alignment mechanism 640 slide horizontally in accordance with the horizontal adjustment.

In some embodiments, openings of light shield 642 may have a size corresponding with multiple contributing factors determining light beam position. For example, such factors may include one or more of: light source location variation, light source beam adjustment variation, rail dimension variation, and light shield manufacturing variation. In such embodiments, vertical and/or horizontal alignment mechanisms may additionally be used. In some embodiments, no alignment mechanism is used.

In some embodiments, a temperature of a light shield may be influenced, for example, so as to reduce or to change or increase light emissions. For example, a thermal electric cooling system or other cooling system may be used.

In some embodiments, an opening is located adjacent to the light source. For example, the opening may be less than about 25 cm, about 5 cm, about 2.5 cm, about 1 cm, about 5 mm, about 2.5 mm, about 1 mm, about 5 micrometers, about 2.5 micrometers, or about 1 micrometer from the light source. In some embodiments, a portion of a light shield having an opening touches the light source.

In some embodiments, the cross-sectional shape of the openings of a light shield is greater in a horizontal direction than in a vertical direction. For example, an aspect ratio of a cross-section of one or more openings may be greater than 1 to 1. In some embodiments, an aspect ratio of a cross-section of one or more openings may be greater than about 1.5 to 1, about 2 to 1, about 5 to 1, about 10 to 1, or about 100 to 1. In some embodiments, the opening is orientable, for example, by rotation. As a result, the opening may, for example, be aligned with a beam having an elongated cross-sectional shape.

In some embodiments, the light source may have a light transmitting surface which is ground and polished to reduce scattering of the light from the light transmitting surface. For example, a laser may have a collimating lens which is ground and polished so as to be smooth enough as to not scatter a recognizable amount of light. In some embodiments, a smoothing layer may be applied to a light transmitting surface of a light source which results in the surface being smooth enough as to not scatter a recognizable amount of light.

Figure 18:
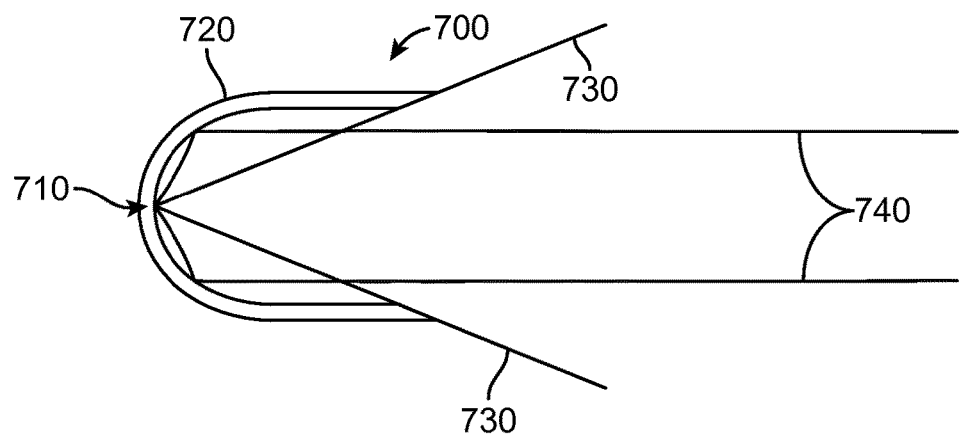
FIGS. 18-20 illustrate embodiments of options of features for light shields.

FIG. 18 is a schematic diagram of a light source 700, such as a flashlight, which has a light generating device 710 and a reflector 720. First light rays 730 from the light generating device 710 exit light source 700 without being reflected from the reflector 720, and second light rays 740 are reflected from the reflector 700 prior to exiting light source 700. As shown, the first light rays 730 span a wider angle than the light rays 740. In some embodiments, when shown on a planer surface substantially perpendicular to the general direction of light travel, the first light rays 730 and second light rays 740 form concentric circles. The circle formed by light rays 740 is smaller and may be brighter than the larger circle formed by the light rays 730. The smaller inner circle may be called the beam, and the larger outer circle may be called the spill.

Light sources, such as light source 700 may include a light shield having features and aspects, such as any of those discussed herein.

Figure 19:
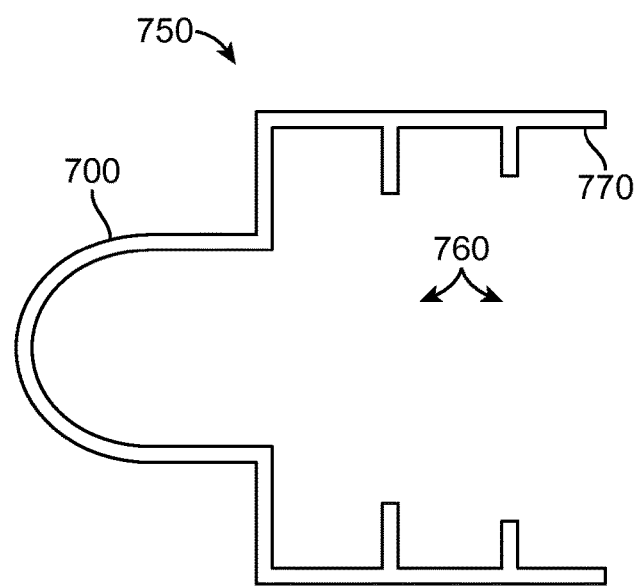

FIG. 19 is a schematic diagram showing light source 700 having a light shield 750. As shown, light shield 750 has openings 760 through which light from the light source 700 may pass. As shown, an opening 760 which is closer to the light source is smaller than an opening 760 which is farther from the light source.

In some embodiments, a boundary line defined by the boundaries of the openings 760 is substantially parallel to a line defined by a particular path of the widest light rays of light rays 730, where the widest light rays travel most perpendicularly from the general direction of the light leaving the light source 700 when compared to all light rays 730. In this embodiment, light shield 750 includes sidewall 770. In some embodiments, sidewall 770 terminates substantially on the boundary line.

Figure 20:
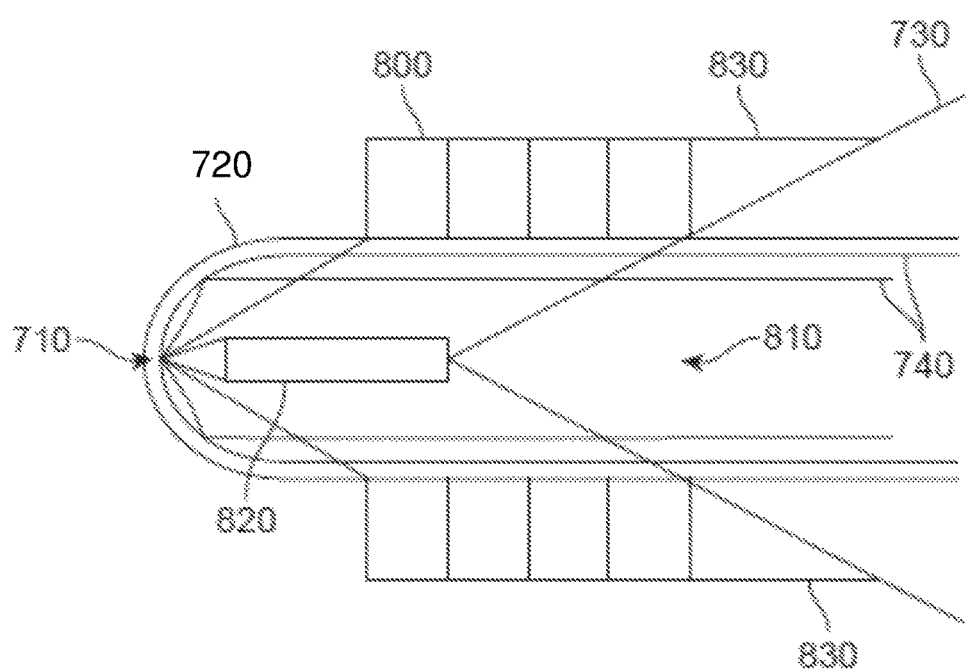

FIG. 20 is a schematic diagram of light source 700 and light shield 800. FIG. 20 also includes extender 820. Extender 820 receives light from device 710, transmits the received light along a length of extender 820, and passes the transmitted light out of an end of extender 820. Each light ray entering extender 820 has a direction which may be characterized as being at an angle from the general direction of light leaving light source 700. Extender 820 is configured to pass each light ray out its end at an angle corresponding with the angle at which the light ray entered extender 820. For example, the magnitude of the angle from the general direction of light leaving light source 700 at which each light ray passes out of extender 820 may be equal to the magnitude of the angle from the general direction of light leaving light source 700 at which it entered extender 820. Other relationships between the angles of the light entering and exiting extender 820 may also be As shown, light shield 800 has openings 810 through which light from the light source 700 may pass. As shown, an opening 810 which is closer to the light source is smaller than an opening 810 which is farther from the light source.

In some embodiments, a boundary line defined by the boundaries of the openings 810 is substantially parallel to a line defined by a particular path of the widest light rays of light rays 740, where the widest light rays travel most perpendicularly from the general direction of the light leaving the light source 700 as compared to all light rays 740.

In some embodiments, reflector 710 of light source 700 is shaped such that light reflected therefrom travels toward an axial center of the light leaving light source 700. A light shield such an embodiment may have openings such that an opening which is closer to the light source is greater than an opening which is farther from the light source.

In this embodiment, light shield 800 includes sidewall 830. In some embodiments, sidewall 830 terminates substantially on a boundary line which is defined by a boundary of the opening 810 farthest from light source 700 and the terminal end of sidewall 830. In some embodiments, the boundary line may be substantially parallel to a line defined by a particular path of the widest light rays of light rays 730, where the widest light rays travel most perpendicularly from the general direction of the light leaving the light source 700 as compared to all light rays 730.

In some embodiments, extender 820 comprises one or more lenses. A first of the lenses receives light entering extender 800 and refracts the received light according to its optical properties. A last of the lenses receives light, for example, from another of the lenses, and refracts the received light such that the refracted light leaves the extender 820.

In some embodiments, extender 820 comprises a light conductor having reflective longitudinal boundaries. Light enters the light conductor and is transmitted away from light source 700. Light which is incident on a longitudinal boundary of the light conductor is reflected away from the longitudinal boundary.

In some embodiments, extender 820 is formed of a substantially transparent material, such as glass, acrylic, or polycarbonate. In some embodiments, the substantially transparent material is coated or covered with a reflective layer, for example, silver or aluminum. In some embodiments, the substantially transparent material is coated or covered with a second material such that light transmitted by extender 820 experiences total internal reflection.

In some embodiments, light generating device 710 includes a lens. In such embodiments, extender 820 may contact, substantially encompass, or be integrated with the lens of light generating device 710. If integrated with the lens, the lens/extender has a first portion which directs light to the reflector 720 and a second portion which conducts light as described herein with reference to embodiments of extender 820.

In some embodiments, extender 820 is a light source for a light shield, such as any described herein, at the end from which light from light source 700 leaves extender 820.

Figure 21:
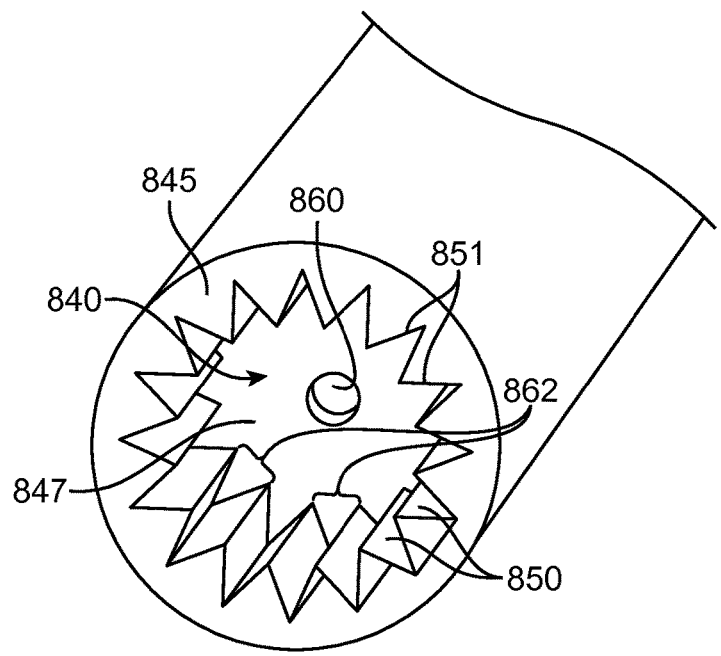
FIG. 21 is an illustration of options of features for a cavity of a light shield

In some embodiments, a light shield having any of the features discussed or shown herein may be used in an environment where it may be exposed to water or other liquids. It may be advantageous to quickly remove water from within the light shield. To facilitate the quick removal of the water, light containment structures of a light shield may include drainage holes. For example, FIG. 21 is a schematic view of a cavity 840 of a light shield with a sidewall 845 and element 847. As shown element 847 has opening 860, through which light from the light source directly passes. In addition, element 847 has drainage holes 862. Accordingly, in this embodiment, water may flow through a drainage hole from cavity 840 to another cavity before exiting the light shield through a similar drainage hole in an element bounding the other cavity. As shown, drainage holes 862 are placed in locations at or near the periphery of element 847. Additionally, or alternatively, one or more sidewalls may have one or more drainage holes such that water may directly exit the light shield from each of the cavities.

In some embodiments, the drainage holes 862 are placed and sized such that light from the light source may not pass through or illuminate the drainage holes without contacting a surface of the light containment structure. In some embodiments, the drainage holes are placed and sized such that light from the light source may not pass through a drainage hole before contacting two surfaces of the light containment structure. In some embodiments, the drainage holes are placed and sized such that light from the light source may not pass through a drainage hole before contacting three or more surfaces of the light containment structure. In some embodiments, light from the light source is prevented from reaching the drainage 862 before contacting, for example, one, two, or three surfaces of the light containment structure, for example by a shielding element, for example, located adjacent the sidewall 845.

In some embodiments, one or more sidewalls include one or more grooves 850 or channels through which water may flow. Accordingly, to remove water from a light shield, a user may orient the light shield such that water flows through the grooves and out of the light shield through the drainage holes.

In some embodiments the grooves or channels in a sidewall of a cavity have surfaces which predominantly reflect light from the light source away from the hole through which light exits the cavity. For example, FIG. 21 is a schematic view of a cavity 840 of a light shield with a sidewall 845 having grooves 850. Light entering from a central portion of cavity 840 bounces predominantly off the walls 851 of the grooves 850. Because of the angles of the walls 851, light directly from the light source is reflected from the walls 851 away from the hole 860, through which light from the light source directly passes.

A portion of the light from the light source bounces from one wall 851 to one or more other walls 851 before exiting the cavity. Based at least in part on the size of the light source, and the distance between the light source and hole 860, the number of grooves 850 and the angles of the walls 851 of the grooves 850 may prevent light reflecting off of walls 850 from exiting through hole 860 prior to reflecting from two or more walls 850. In some embodiments, the number of grooves 850 and the angles of the walls 851 of the grooves 850 may prevent light reflecting off of walls 851 from exiting through hole 860 prior to reflecting from 3, 4, 5, 6, 7, 8, 9, 10, or more walls 851.

In some embodiments, the angles of the walls 851 of the grooves 850 are angled such that light received by a first wall 851 of a particular groove 850 directly from the light source is reflected so as to hit a second wall 851 of the particular groove 850. In some embodiments, the angles of the walls 851 of the grooves 850 are angled such that no light received by a first wall 851 of a particular groove 850 directly from the light source is reflected so as to hit a second wall 851 of the particular groove 850.

In some embodiments, the walls 851 of the grooves 850 may be highly reflective, such that substantially all light incident thereon is reflected. In such embodiments, elements of the light shield forming openings through which light from the light source directly passes may be configured to absorb light incident thereon. Accordingly, light from the light source incident on the walls 851 of the grooves 850 is substantially entirely reflected from the walls 851 and is absorbed by one of the elements forming the openings and/or another element. In some embodiments, a light shield having grooves and light absorbing elements may include only a single cavity, through which light from the light source passes before leaving the light shield.

In some embodiments, a light shield may include any operable combination of any of the light shield features illustrated in FIG. 21 and shown or discussed elsewhere herein.

Figure 22:
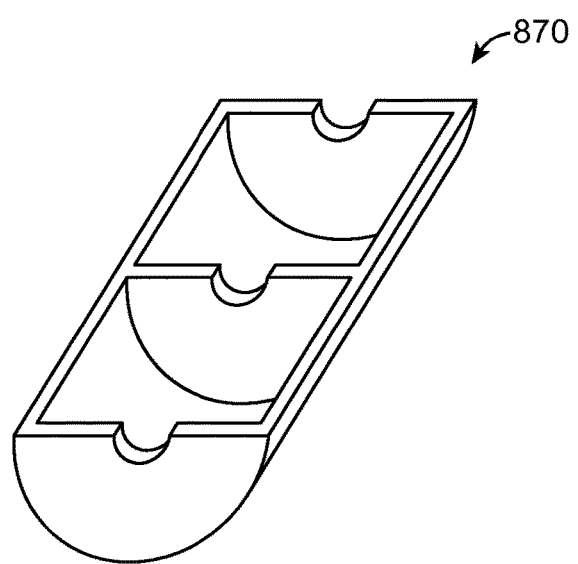
FIG. 22 illustrates options of features for a portion of a light shield.

In some embodiments, a light shield may be formed by connecting two substantially identical pieces. FIG. 22 is a schematic diagram of a piece 870, which may be connected to a substantially identical piece (not shown) to form a light shield.

In some embodiments, each of the identical pieces includes threads (not shown) by which the light shield may be connected to a light source. Once connected to each other first and second identical pieces collectively form, for example a double helix, or quadruple helix thread by which the light shield may be connected to a light source.

In some embodiments, a light shield may include any operable combination of any of the light shield features illustrated in FIG. 22 and shown or discussed elsewhere herein.

Figure 23:
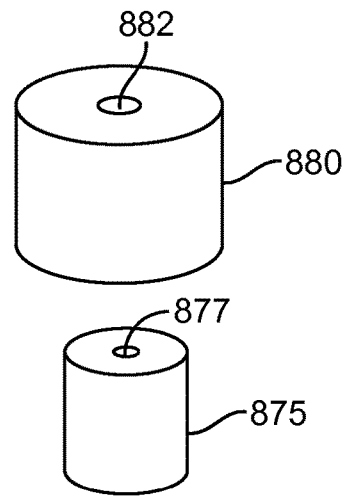
FIG. 23 illustrates options of features for a portion of a light shield comprising two pieces.

In some embodiments, a light shield may be formed by nesting first and second pieces. FIG. 23 is a schematic diagram illustrating first and second pieces 875 and 880, respectively. To form the light shield, the first piece 875 is inserted into second piece 880. In some embodiments, second piece 880 is sized and shaped such that first piece 875 may pass into second piece 880 only to an extent that hole 877 is a desired distance from hole 882.

In some embodiments, a light shield may include any operable combination of any of the light shield features illustrated in FIG. 23 and shown or discussed elsewhere herein.

Figure 24:
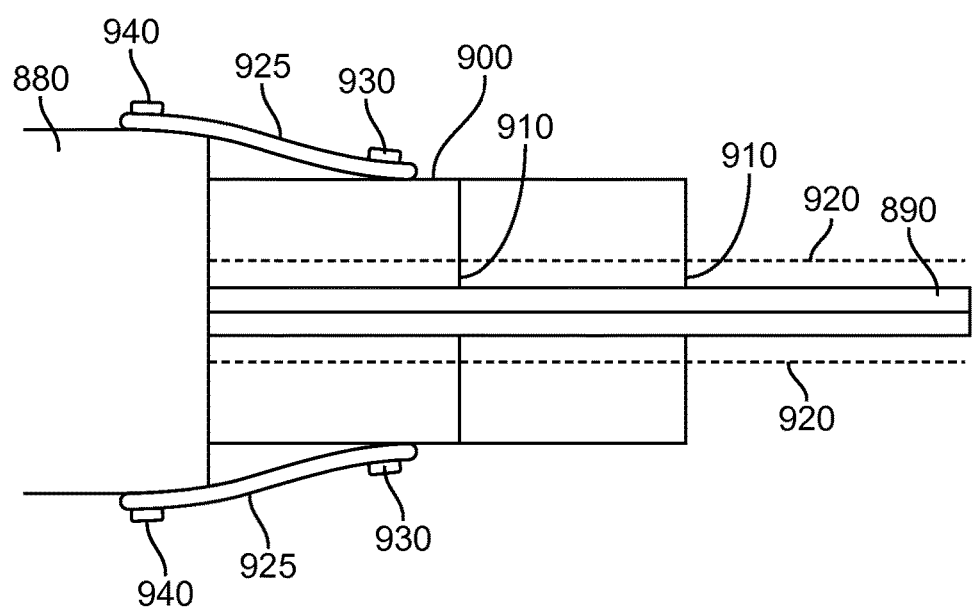
FIG. 24 illustrates an embodiment of options of features for a light shield.

FIG. 24 is a schematic diagram of light shield 900 connected to light source 880 generating laser beam 890. As shown, light shield 900 includes holes 910, through which laser beam 890 passes. In this embodiment, light shield 900 defines a path 920 which is bounded by holes 910. As shown, the axis or the general direction of the path is not parallel with the direction of the laser beam 890.

In some embodiments, such as that shown in FIG. 24, light shield 900 is connected to light source 880 by elastic members 925. In this embodiment, the light shield 900 includes posts 930 by which elastic members 925 are attached to light shield 900. Similar posts 940 secure elastic members 925 to light source 880.

In some embodiments, light shield 900 may be connected to light source 880 by substantially inelastic members (not shown). For example, substantially inelastic members may connect posts 930 or other attachment elements on light shield 900 to attachment elements connected to light source 880. In some embodiments, the substantially inelastic members or attachment elements on light shield 900 include mechanisms which may be manipulated to attach and detach light shield 900 to and from light source 880. In some embodiments, the substantially inelastic members or attachment elements on light shield 900 include mechanisms which may be manipulated to tighten or loosen the attachment. In some embodiments, the substantially inelastic members or attachment elements on light shield 900 may be manipulated by hand, without tools. In some embodiments tools are required for such manipulation. In some embodiments, the substantially inelastic members are rigid.

In some embodiments, light shield 900 has additional posts (not shown), which are located proximate the end of the light shield distill to the light source 880. The additional posts may, for example, serve as attachment anchors, for example, for laser sight accessories.

In some embodiments, a light shield may include any operable combination of any of the light shield features illustrated in FIG. 24 and shown or discussed elsewhere herein.

Figure 25:
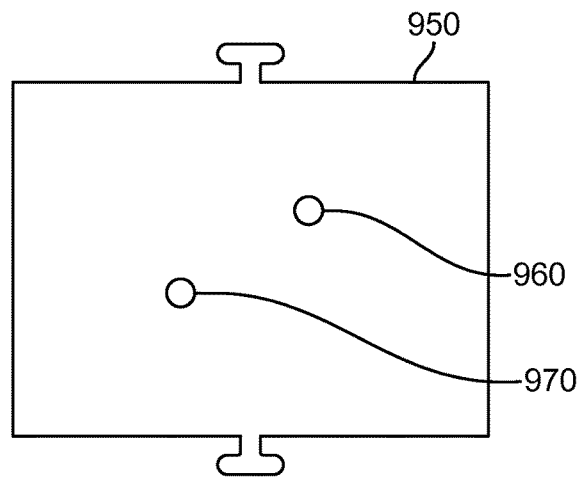
FIG. 25 illustrates a device having more than one light source.

FIG. 25 is a schematic illustration of a device 950 having more than one light source. As shown, device 950 has first light source 960 and second light source 970. Light sources 960 and 970 may, for example, be laser light sources.

Figure 26:
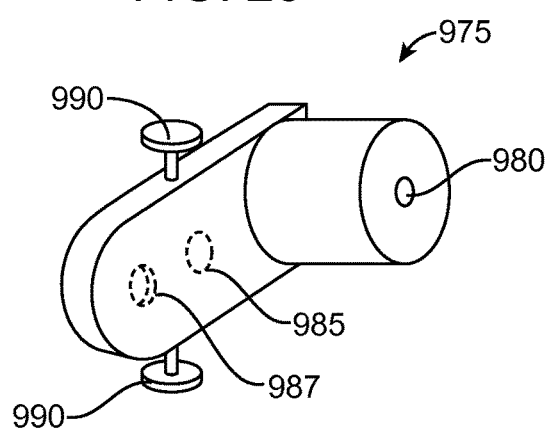
FIGS. 26-31 illustrate various embodiments of options of features for light shields.

FIG. 26 is a schematic illustration of a light shield 975 configured for use with device 950. Light shield 975 defines only a single shielded path through which light from device 950 passes unobstructed. In the illustrated embodiment, the single shielded path is partially defined by hole 980. When attached to device 950, light shield 975 may be controllably oriented such that the single shielded path is aligned with either the first light source 960 or second light source 970. Accordingly, if the first light source 960 of device 950 is used, the light shield 975 may be oriented such that the single shielded path is aligned with the first light source 960. Likewise, if the second light source 970 of device 950 is used, the light shield 975 may be oriented such that the single shielded path is aligned with the second light source 970.

In some embodiments, the device 950 side of light shield 975 includes contours (not shown) which correspond with topographical features of device 950. The contours may serve to restrict movement of light shield 975 and allow the light shield 975 to be mated to device 950 such that the single shielded path is aligned with either the first light source 960 or the second light source 970.

In the illustrated embodiment, light shield 975 includes posts 990 by which light shield 975 may be connected to device 950, for example, using an attachment structure such as that described elsewhere herein. Other attachment structures may alternatively be used.

Light shield 975 may include optional light passage 985. Light passage 985 may be aligned with the light source with which the single shielded path of light shield 975 is not aligned. Light passage 985 is configured to pass a portion of light originating from the light source with which it is aligned toward a portion of light shield 975 so as to illuminate the portion. In some embodiments, all or substantially all light passing through light passage 985 contacts light shield 975. Light passage 985 may be useful for example, if light shield 975 is inadvertently oriented such that the single shielded path of light shield 975 is aligned with the light source of device 950 not being used. For example, if the first light source 960 of device 950 is being used, and the light shield 975 is oriented such that the single shielded path is aligned with the second light source 970, light passage 985 allows an amount of light from second light source 970 to illuminate a portion of light shield 975. Such illumination serves as an indicator for the user that the single shielded path of light shield 975 is oriented with the light source not being used.

Light shield 975 may include optional light passage 987. Light passage 987 provides a second unobstructed light path. In such embodiments, when used with device 950, substantially all light from the light source with which light passage 987 is aligned is not substantially affected by light shield 975. In some circumstances, it may be desirable to not shield a light source. In such circumstances, orienting the light shield such that light passage 987 is aligned with the light source to be used, allows the light source to be used without shielding.

In some embodiments, a light shield may include any operable combination of any of the light shield features illustrated in FIG. 26 and shown or discussed elsewhere herein.

Figure 27:
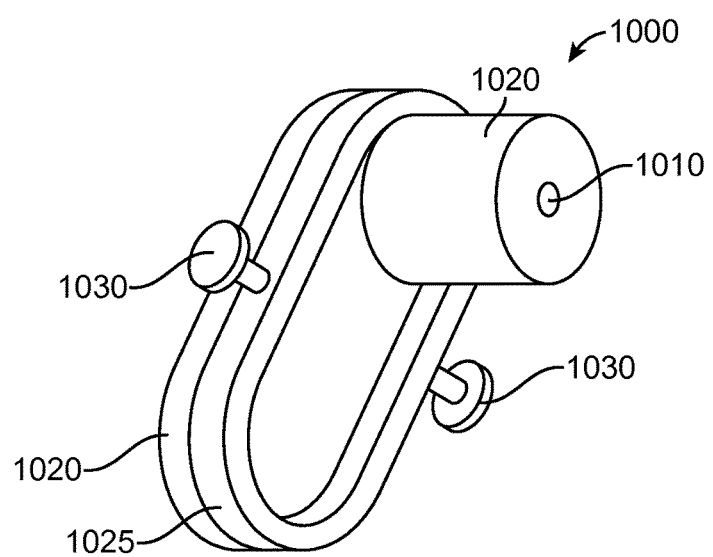

FIG. 27 is a schematic illustration of a light shield 1000 configured for use with device 950. Light shield 1000 defines only a single shielded path through which light from device 950 passes unobstructed. In the illustrated embodiment, the single shielded path is partially defined by hole 1010. When attached to a device 950, light shield 1000 may be controllably oriented such that the single shielded path is aligned with either the first light source 960 or second light source 970.

Light shield 1000 includes light shielding element 1020 and attachment element 1025. In the illustrated embodiment, light shielding element 1020 and attachment element 1025 are distinct. Attachment element 1025 includes posts 1030, by which attachment element 1025 may be connected to device 950 using, for example, a mechanism described above. As a result of attachment element 1025 being connected to device 950, light shielding element 1020 is held in position. Because the light shielding element 1020 is distinct from attachment element 1025, while being held in place by attachment element 1025, light shielding element 1020 may be twisted and reoriented so as to selectably align hole 1010 with either first light source 960 or second light source 970.

In some embodiments, a light shield may include any operable combination of any of the light shield features illustrated in FIG. 27 and shown or discussed elsewhere herein.

Figure 28:
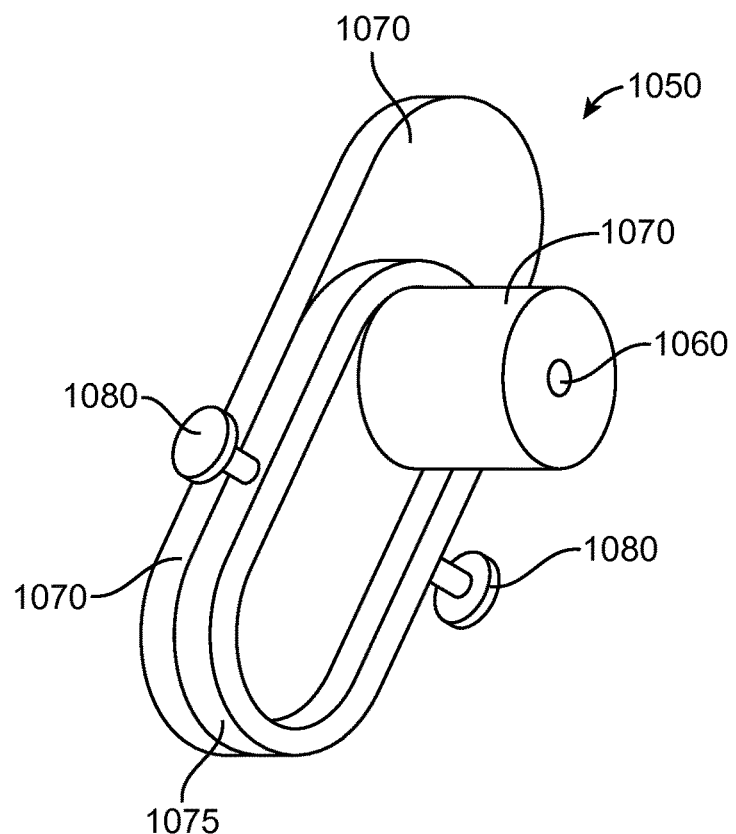

FIG. 28 is a schematic illustration of a light shield 1050 configured for use with device 950. Light shield 1050 defines only a single shielded path through which light from device 950 passes unobstructed. In the illustrated embodiment, the single shielded path is partially defined by hole 1060. When attached to a device 950, light shield 1050 may be controllably oriented such that the single shielded path is aligned with either the first light source 960 or second light source 970.

Light shield 1050 includes light shielding element 1070 and attachment element 1075. In the illustrated embodiment, light shielding element 1070 and attachment element 1075 are distinct. Attachment element 1075 includes posts 1080, by which attachment element 1075 may be connected to device 950 using, for example, a mechanism described above. As a result of attachment element 1075 being connected to device 950, light shielding element 1070 is held in position. Because the light shielding element 1070 is distinct from attachment element 1075, while being held in place by attachment element 1075, light shielding element 1070 may slide so as to selectably align hole 1010 with either first light source 960 or second light source 970.

In some embodiments, a light shield may include any operable combination of any of the light shield features illustrated in FIG. 28 and shown or discussed elsewhere herein.

Figure 29:
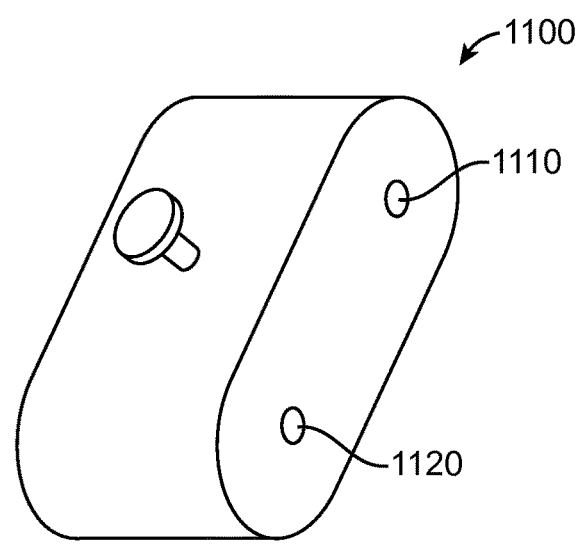

FIG. 29 is a schematic illustration of a light shield 1100 configured for use with device 950. Light shield 1000 defines first and second shielded paths through which light from device 950 passes unobstructed. In the illustrated embodiment, the shielded paths are partially defined by holes 1110 and 1120.

In some embodiments, the device 950 side of light shield 1100 includes contours (not shown) which correspond with topographical features of device 950. The contours may serve to restrict movement of light shield 1100 and allow the light shield 1100 to be mated to device 950 such that the holes 1110 and 1120 of light shield 1100 are respectively aligned with the first light source 960 and the second light source 970.

When mated to device 950, hole 1110 may be aligned with first light source 960 and hole 1120 may be aligned with second light source 970. In some embodiments, when one of the light sources 960 and 970 is used, a cover (not shown) may be applied to the hole 1110 or 1120 aligned with the other of the light sources 960 and 970. In some embodiments, the cover may be slidably attached to light shield 1100, such that the cover slides so as to cover one of the holes 1110 and 1120 and to uncover the other of the holes 1110 and 1120. In some embodiments, the cover may be removeably attachable to the light shield 1100 at different locations. For example, a first location may correspond with hole 1110, such that, when attached to light shield 1100 in a first position, the cover covers hole 1110, and when attached to light shield 1100 in a second position, the cover covers hole 1120. In some embodiments, the cover is tethered or attached to light shield 1100.

In some embodiments, a light shield may include any operable combination of any of the light shield features illustrated in FIG. 29 and shown or discussed elsewhere herein.

Figure 30:
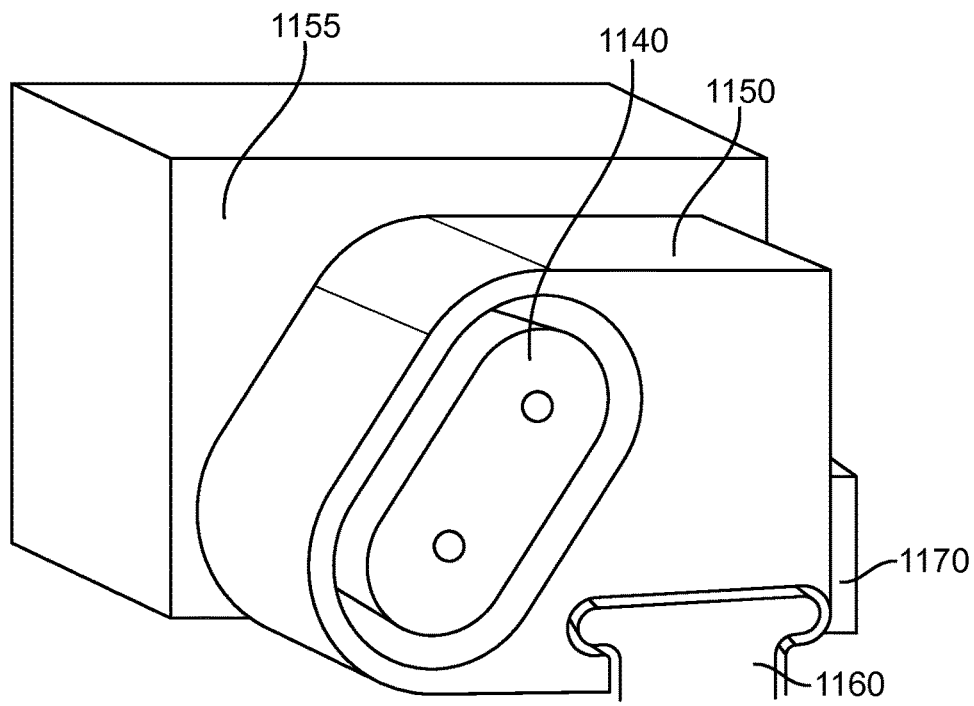

FIG. 30 is an illustration of light shield 1140 attached to light source 1155. Light shield 1140 may have any of the features described herein, which pertain to light shields. For example, light shield 1140 may be attached to light source 1155 with one or more attachment elements, such as those discussed above.

As shown in FIG. 30, light shield 1140 is partially encompassed by bump guard 1150, which is attached to rail 1160 by rail attachment device 1170. Bump guard 1150 is spaced apart from and does not contact light shield 1140. Bump guard 1150 is configured to protect light shield 1140 from impacts, which might otherwise cause light shield 1140 to become misaligned with light source 1155. Because the bump guard 1150 is fixed to the rail 1160, mechanical forces of an impact to the bump guard 1150 are translated by the bump guard 1150 to the rail 1160.

In some embodiments, bump guard 1150 serves as an anchor for one or more alignment mechanisms, such as those discussed elsewhere herein. In some embodiments, the alignment mechanism comprises first and second rotatable elements which each adjust a spacing between the bump guard 1150 and the light shield 1140 according to a rotation degree or state, such as those used for windage and elevation adjustment of the light source. The force exerted on the light shield 1140 by the first and second rotatable elements may be opposed by a spring element contacting the light shield 1140.

In some embodiments, a light shield may include any operable combination of any of the light shield features illustrated in FIG. 30 and shown or discussed elsewhere herein.

Figure 31:
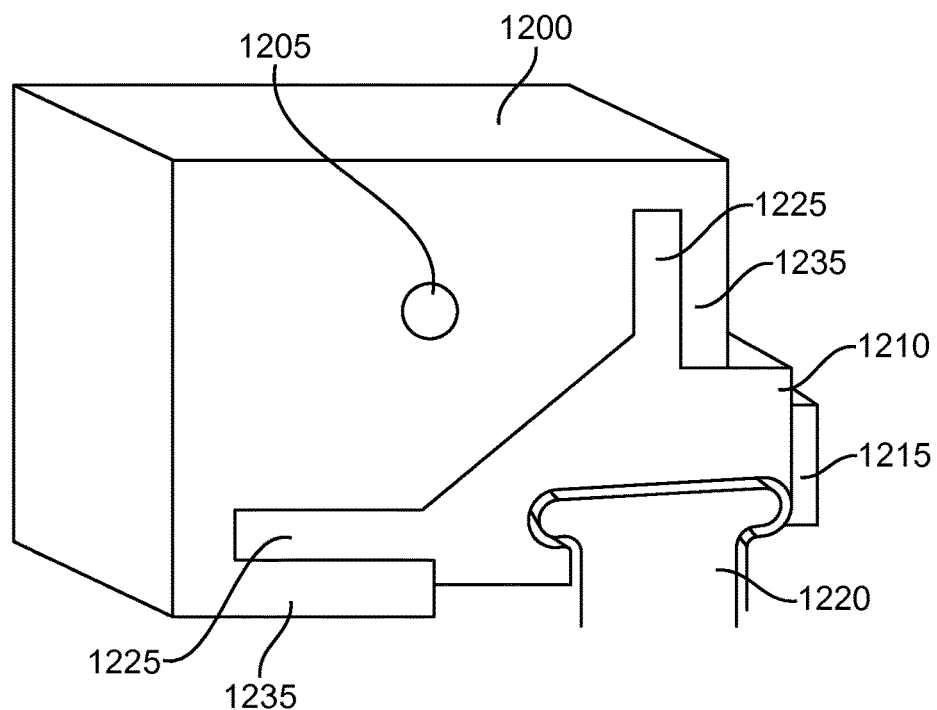

FIG. 31 is an illustration of light shield 1200, which is configured for use with a light source having more than one laser, such as light source 950, described above with reference to FIG. 25. Light shield 1200 is attached to rail 1220 by rail mount 1210, which has rail attachment device 1215. Light shield 1200 may be attached to rail mount 1210 with either of two orientations. In the illustrated orientation, opening 1205 is aligned with a first of the lasers of the light source. In the alternate orientation, opening 1205 is aligned with the second of the lasers of the light source.

Rail mount 1210 has attachment structures 1225, which are configured to engage light shield 1200 at corresponding attachment features 1235. Rail mount attachment structures 1225 and light shield attachment features 1235 are symmetric about a symmetry plane, which is perpendicular to a line defined by the center point of opening 1205 in each of the two orientations, where the symmetry plane includes the center point of the defined line. Numerous other rail mount attachment structures and corresponding light shield attachment features may be used.

In some embodiments, rail mount attachment device 1215 includes a piece which extends through the light shield 1200. For example, the piece may occupy a space within a cavity of the light shield 1200 which is not directly illuminated by the light source. For example, the piece may be in a shadow of a component of the light shield 1200.

In some embodiments of a light shield, if the light shielding properties are not desired, a transparent or semi-transparent filter may be placed in the path of the light beam. The filter may be configured pass beam light to illuminate an object, and to scatter light away from the beam such that the light is visible from substantially all angles forward the light shield.

The rails discussed herein may be part of or connected to a weapon.

Any of the embodiments discussed herein have features and characteristics which result in performance similar to or better than the light suppression and shielding performance discussed with reference to the light shield 20 of FIG. 3A.

Any operable combination of the features discussed herein may be implemented to form a light shield having characteristics resulting from the combination of features. In some implementations, the operable combinations have synergistic characteristics as the result of synergistic effects of two or more of the combined features, as understood by one of ordinary skill in the art. All such operable combinations are contemplated and explicitly disclosed hereby.

While various aspects, processes, actions, and systems have been described as being included in the embodiments discussed, the various aspects, processes, actions, and systems can be practiced with various modifications. For example, implementations having aspects of more than one embodiment may be practiced. In addition, implementations having certain aspects omitted may be practiced.

Various other configurations may be used in light shields. For example, a plane defined by an opening may not be perpendicular to the sidewalls. In some embodiments, the sidewalls are not parallel to the general direction of the light travel from the light source. In some embodiments, the planes defined by openings of a light shield are not perpendicular to the general direction of the light travel from the light source.

What is claimed is:

1. A device for concealing position disclosing light emitted by a laser sight of a weapon, the device comprising:
   a sidewall defining a side of a cavity configured to receive laser sight light from the laser sight of the weapon through a first opening; and
   a first element nonparallel with the side of the cavity and at least partly defining a first end of the cavity, wherein the first element at least partly defines a second opening configured to pass a portion of the laser sight light from the cavity toward an object such that the object is illuminated to a user of the weapon by the portion of the laser sight light from the second opening,
   wherein a portion of the sidewall defining the side of the cavity is exposed to the second opening through the cavity, and
   wherein the cavity is configured such that the laser sight light does not directly illuminate any portion of the sidewall exposed to the second opening.

2. The device of claim 1, further comprising a second element located between the first opening and the second opening, wherein the second element divides the cavity into a first cavity located between the first opening and the second element and a second cavity located between the second element and the first element, and wherein the second element is configured to prevent the laser sight light from directly illuminating the sidewall in the second cavity.

3. The device of claim 1, further comprising a rail mount configured to detachably connect the device to a rail of a weapon.

4. The device of claim 1, further comprising a third opening located in one of the sidewall and the first element, wherein the third opening is configured to drain a liquid from the cavity.

5. The device of claim 1, wherein a width of the second opening is greater than a width of the first opening.

6. The device of claim 1, wherein a position of the second opening is adjustable with respect to a path defined by the portion of the laser sight light illuminating the object.

7. The device of claim 1, wherein the device is configured to open so that internal portions of the sidewall and the first element are accessible for servicing.

8. A device for concealing position disclosing light emitted by a laser sight of a weapon, the device comprising:
   a sidewall defining a side of a cavity configured to receive laser sight light from the laser sight of the weapon through a first opening;
   a first element nonparallel with the side of the cavity and at least partly defining a first end of the cavity, wherein the first element defines a second opening configured to pass a portion of the laser sight light from the cavity toward an object such that the object is illuminated to a user of the weapon by the portion of the laser sight light from the second opening; and
   a third opening located in one of the sidewall and the first element, wherein the third opening is configured to drain a liquid from the cavity.

9. The device of claim 8, further comprising a rail mount configured to detachably connect the device to a rail of a weapon.

10. The device of claim 8, wherein a portion of the sidewall defining the side of the cavity is exposed to the second opening through the cavity, and wherein the cavity is configured such that the laser sight light does not directly illuminate any portion of the sidewall exposed to the second opening.

11. The device of claim 8, wherein a width of the second opening is greater than a width of the first opening.

12. The device of claim 8, wherein a position of the second opening is adjustable with respect to a path defined by the portion of the laser sight light illuminating the object.

13. The device of claim 8, wherein the device is configured to open so that internal portions of the sidewall and the first element are accessible for servicing.

* * * * *